Inventor
Joseph E. Padgett
By Strauch & Hoffman
Attorneys

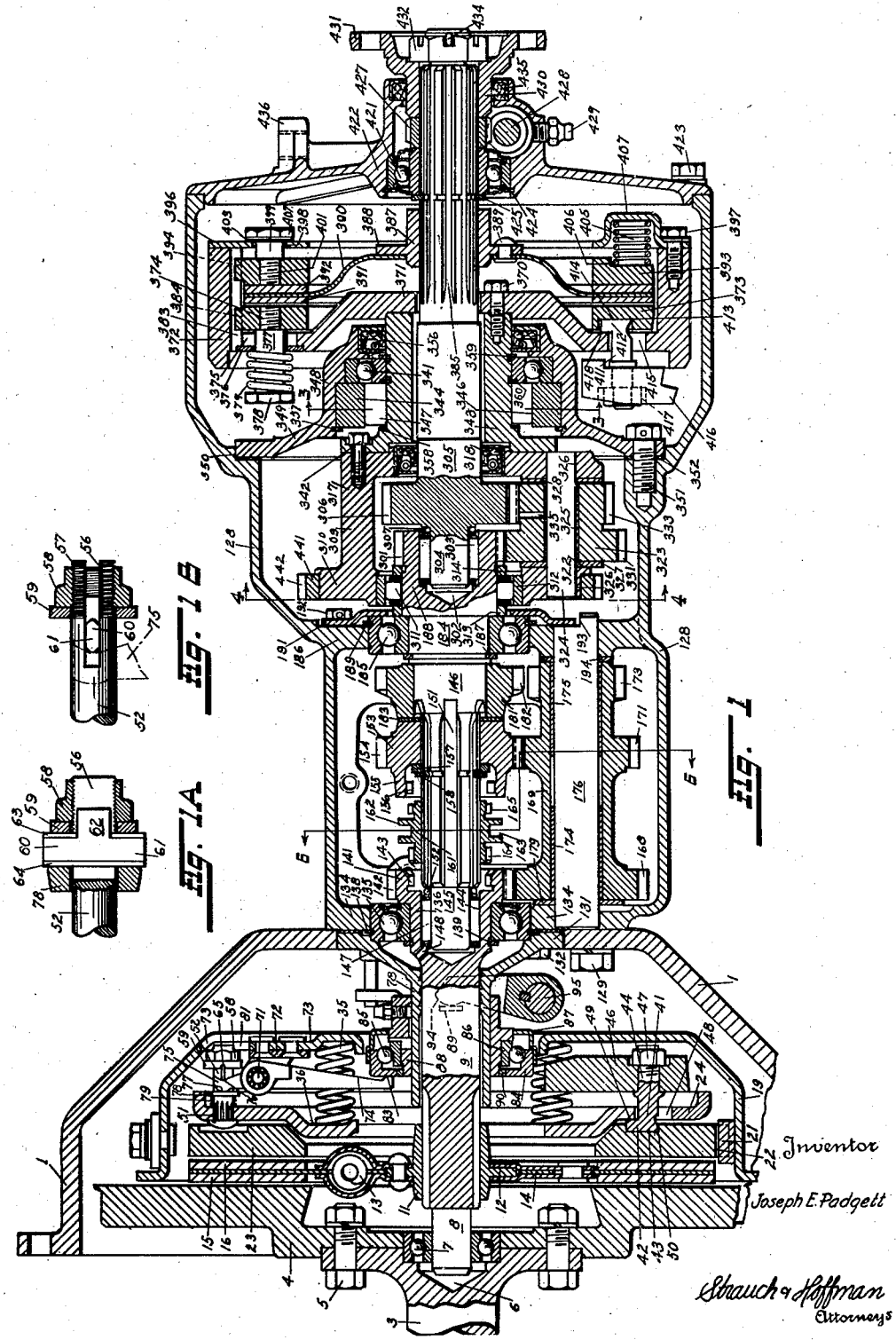

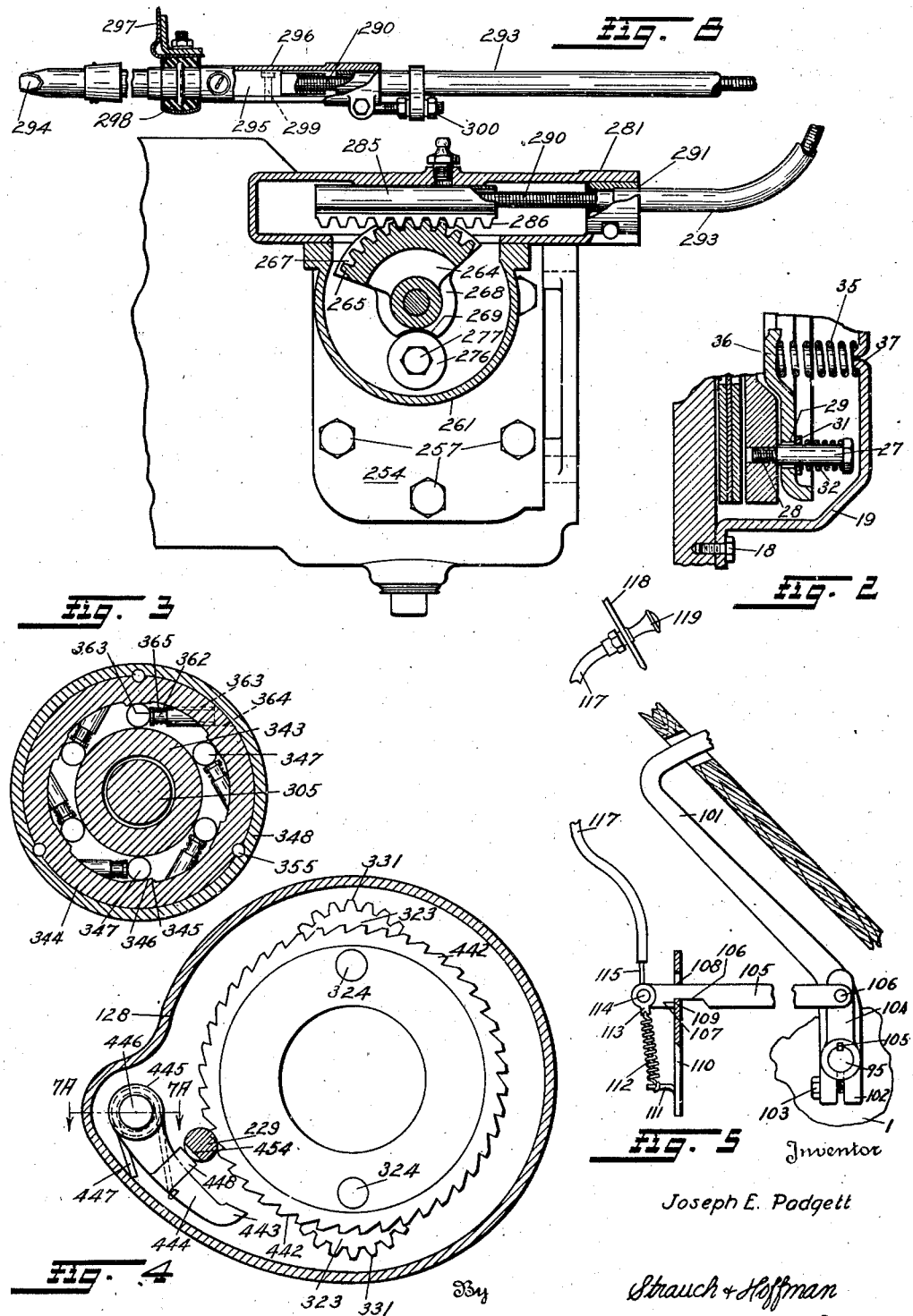

April 26, 1938.  J. E. PADGETT  2,115,212

AUTOMATIC POWER TRANSMITTING MECHANISM

Filed Dec. 19, 1934  7 Sheets-Sheet 4

Inventor
Joseph E. Padgett

By Strauch & Hoffman
Attorneys

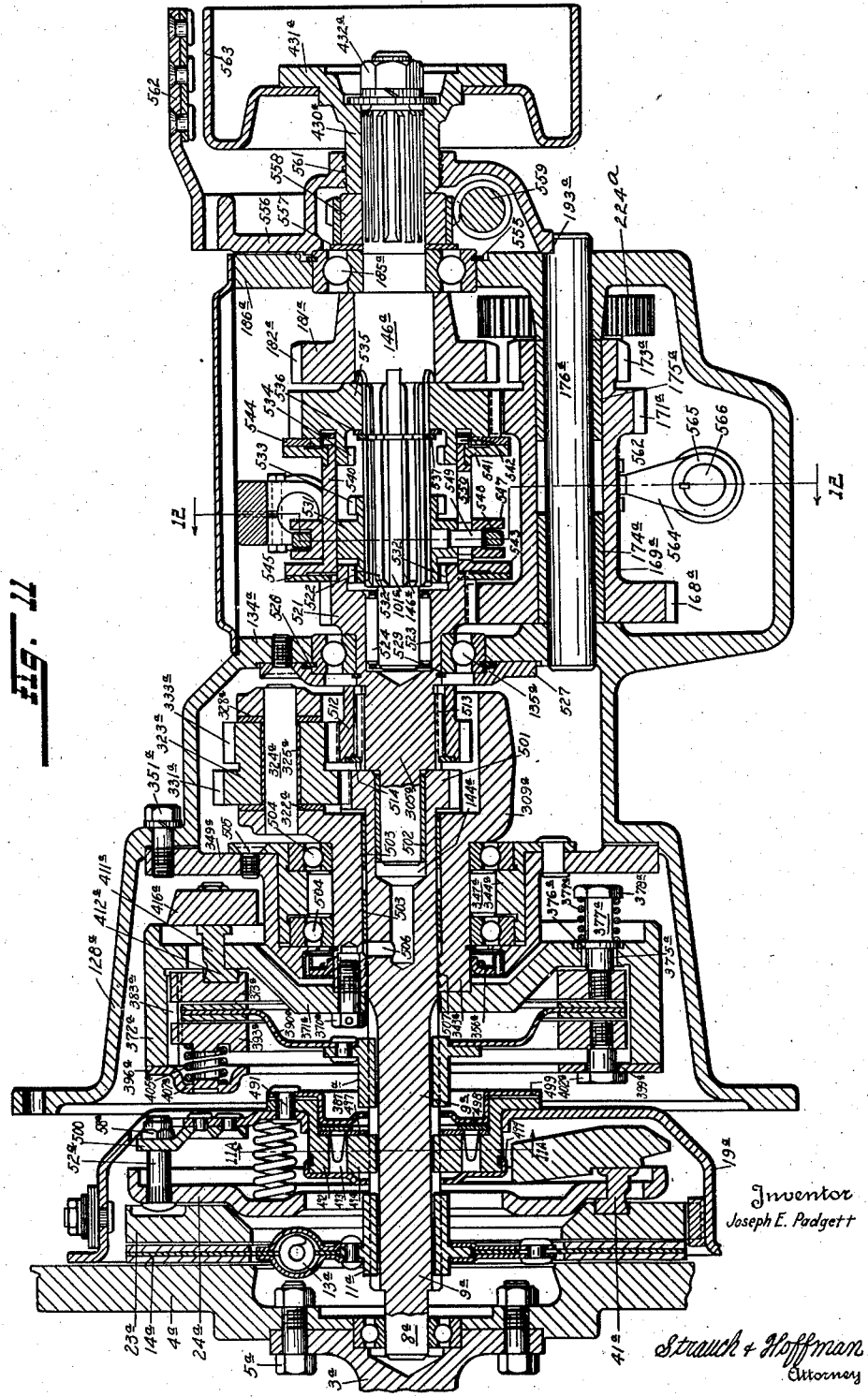

April 26, 1938.  J. E. PADGETT  2,115,212
AUTOMATIC POWER TRANSMITTING MECHANISM
Filed Dec. 19, 1934  7 Sheets-Sheet 6
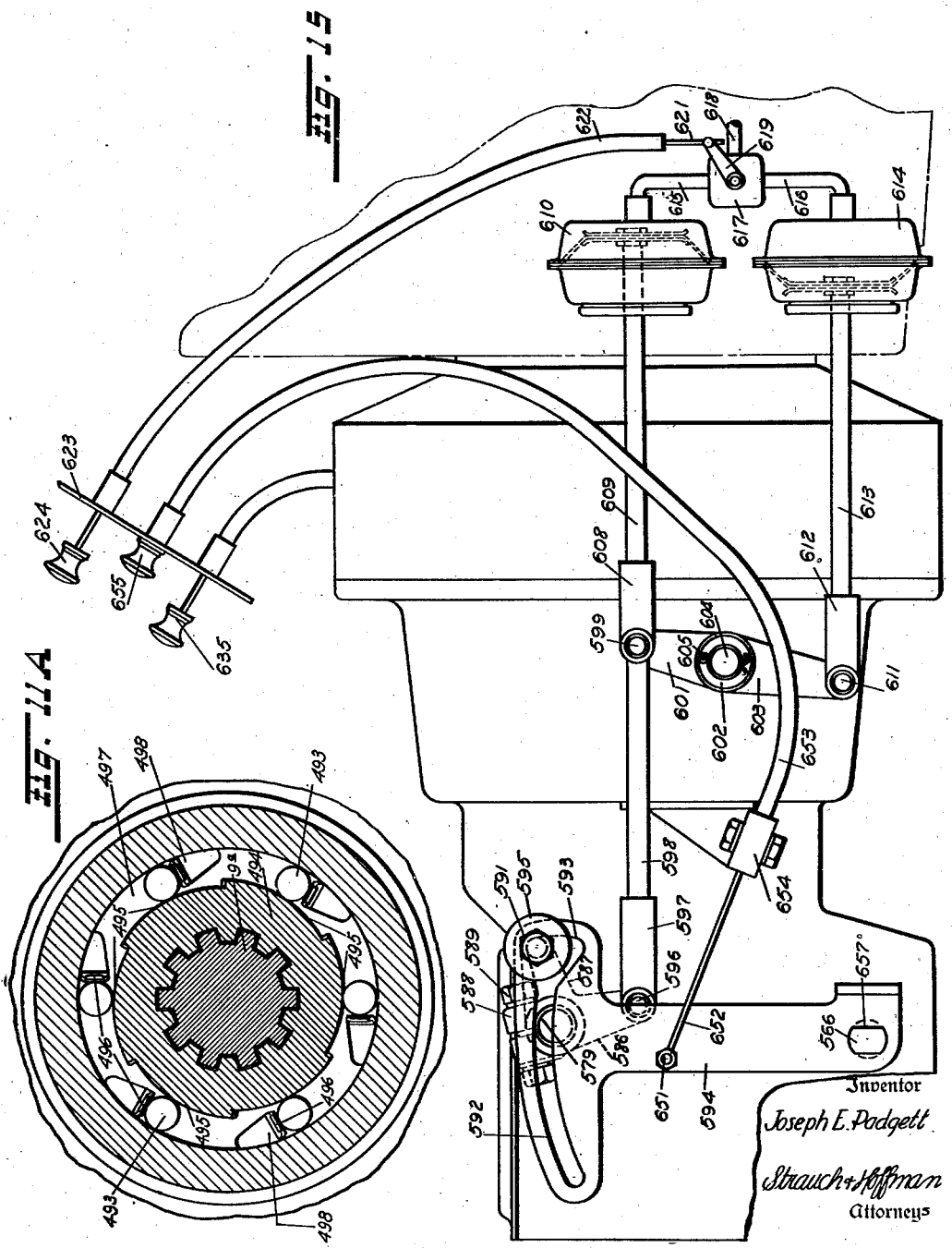
Inventor
Joseph E. Padgett
Strauch + Hoffman
Attorneys April 26, 1938.  J. E. PADGETT  2,115,212
AUTOMATIC POWER TRANSMITTING MECHANISM
Filed Dec. 19, 1934  7 Sheets-Sheet 7

Inventor
Joseph E. Padgett

By Strauch & Hoffman
Attorneys

Patented Apr. 26, 1938

2,115,212

UNITED STATES PATENT OFFICE 2,115,212

AUTOMATIC POWER TRANSMITTING MECHANISM

Joseph E. Padgett, Toledo, Ohio

Application December 19, 1934, Serial No. 758,327

4 Claims. (Cl. 74—260)

The present invention relates to power transmitting mechanisms, and is more particularly concerned with transmissions for automotive vehicles, although it is not limited to such use.

The transmission of the present invention is semi-automatic, or selective automatic in operation, as it automatically effects a change in the torque multiplication when a reversal of drive occurs therein. Although transmissions of this general character have been heretofore proposed, they have not proved altogether satisfactory for several reasons. One of the defects of such prior transmissions, which are of complex and expensive construction, is that they are so designed that it is necessary to decelerate the engine to speeds below the speed of the driven shaft in order to effect the shift, with the result that when the shift does occur, the vehicle must pick up the engine with the result that the vehicle loses considerable headway while this shift operation is being effected.

The shift operation just described is also defective because proper consideration has not been given the design of the parts of such prior transmissions, with the result that when the shift occurs the vehicle is suddenly retarded in an undesirable manner. It has been proposed to remedy this defect of such prior transmissions by incorporating a clutch therein that would slip to some extent in one direction, but this resulted in complicated impractical structures, and did not fully cure the trouble because with such transmissions the loss of considerable headway was still involved in shifting. It was still necessary to wait a substantial period of time, during which no power was transmitted, to allow the engine to decelerate to speeds below the speed of the driven shaft and effect the shift.

My improved transmission also embodies an auxiliary transmission, disposed in the drive line for affording an emergency torque multiplication range, and although prior transmissions have been heretofore devised utilizing an arrangement of this general character, in such prior arrangements it is almost impossible to shift the auxiliary transmission unless the vehicle is at rest, because of synchronizing difficulties due to the constructions used. Prior transmissions of this general character which have been heretofore proposed have been complex and expensive mechanisms and they also possess the further serious disadvantage of being difficult if not impossible to adjust when the parts become worn through use.

Prior automatic transmissions heretofore proposed, and which were ostensibly developed to simplify the control of automotive vehicles, have as a matter of fact been equipped with controls that are far more complex than those now used with conventional hand-shifted transmissions.

It is accordingly a major object of the present invention to devise a transmission which will automatically shift and change the torque multiplication ratio between a prime mover and a load in response to a change in the driving relations of the parts in the transmission, without entailing any substantial loss of headway of the load, and without imparting to the load a sudden forward driving or retarding impulse of any considerable magnitude.

It is a further major object of my invention to devise automatic transmissions that fully meet all of the operating requirements of automotive and similar drives, and yet that are of low cost, simple and compact design, permitting them to be readily installed in the space allotted to such units in automotive vehicles and the like.

A further important object of my invention is to devise, for use on automotive vehicles or the like, a transmission that will drive the vehicle through a certain torque multiplication when the vehicle is started, and that will automatically shift into a lower torque multiplication or higher gear ratio without a perceptible shock or impulse when the transmission is momentarily driven by the vehicle, and before the engine decelerates to speeds below the speed corresponding to the vehicle speed in the lower torque multiplication.

It is another object of my invention to devise a transmission having a selective auxiliary transmission so associated with it that the auxiliary transmission may be readily shifted during any phase of operation, without synchronizing difficulties.

A further object of the invention is to devise a transmission having a forward-reverse gear train and a uni-directional gear train disposed between a prime mover and a load, and to provide means for automatically preventing the uni-directional gear train from overrunning when the forward-reverse gear train is operating in reverse.

It is another object of this invention to provide a transmission of the character that automatically "shifts" in response to changes in driving relations, with novel means for selectively preventing the transmission from responding to such changes.

Subordinate to the above, it is an object of this invention to devise novel simplified transmission controls, novel structural designs and other important, but more detailed transmission features that will hereinafter appear.

My invention further aims to design a transmission of the general character that automatically shifts when a reversal of drive occurs therein, through which the vehicle or other load will be smoothly picked up in a new gear ratio when the transmission shifts, irrespective of the manner in which the transmission is operated.

Another object of this invention is to devise a novel remote-control mechanism for actuating transmissions and the like.

A still further object of this invention is to devise an automatic clutch having means associated therewith that are constantly operable to transmit power from the driven to the driving member even when the clutch is disengaged, and yet which is incapable of transmitting power from the driving to the driven member.

My invention also aims to provide selective or other transmissions with a novel device for facilitating shifting the same into different gear ratios and reducing shifting noises to a minimum. It is another object of this invention to devise a transmission that normally will automatically shift into a higher gear when the direction of drive is reversed, and yet which may be operated to maintain the transmission in the higher gear at all times, irrespective of the direction of drive.

Further objects of my invention will become apparent as the description thereof proceeds in connection with the annexed drawings, and from the appended claims.

In the drawings:

Figure 1 is a longitudinal sectional view of the preferred form of my invention, and in order to clarify the illustration, the section through the upper part of the carrier has been taken at 90° from the section of the cover part thereof.

Figure 1A is a detailed sectional view of the knife edge assembly associated with the primary clutch throwout mechanism disclosed in Figure 1 of the drawings.

Figure 1B is a view partly in section and partly in elevation as seen when looking down on top of the structure Figure 1A.

Figure 2 is a fragmental detail view of one of the holdback bolt assemblies employed in the form of my invention disclosed in Figure 1.

Figure 3 is a view taken substantially on line 3—3 of Figure 1, and illustrates the overrunning clutch assembly utilized therewith.

Figure 4 is a view taken substantially on line 4—4 of Figure 1, and illustrates the pinion carrier lock mechanism.

Figure 5 is a view of the manual clutch and latching means therefor employed in the form of my invention shown in Figure 1.

Figure 8 is a view in elevation illustrating the manual control assembly utilized with that part of my invention disclosed in Figure 6.

Figure 11 is a longitudinal sectional view, similar to Figure 1, of an alternate form of my invention.

Figure 11A is a sectional view taken on line 11A—11A of Figure 11, and illustrating the overrunning clutch assembly employed therein.

Figure 15 is a view in elevation of the control assembly associated with the form of my invention disclosed in Figure 11, as seen when it is viewed from the opposite side thereof.

With continued reference to the drawings, wherein like reference characters designate like parts throughout the several views thereof, my novel power transmitting mechanism is enclosed in a housing denoted generally at 1.

Figure 6:
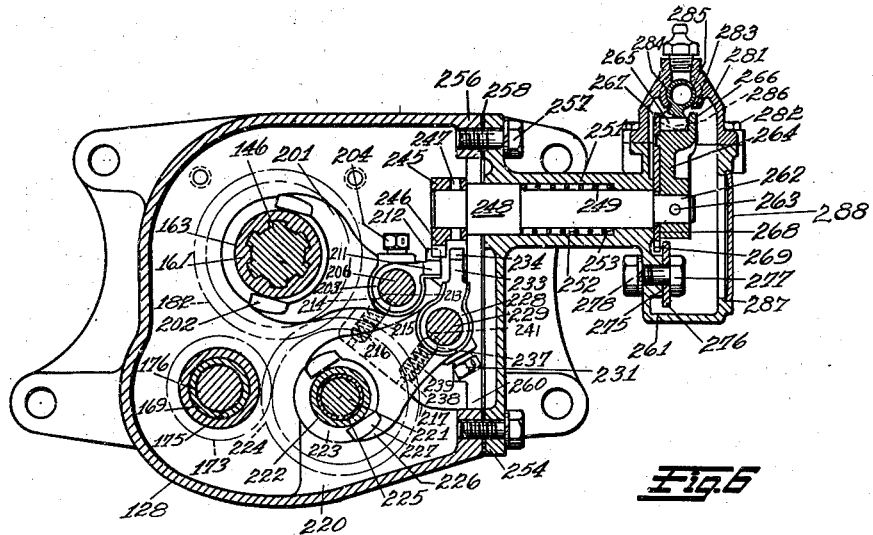
Figure 6 is a view taken substantially on line 6—6 of Figure 1, and discloses the control mechanism for actuating the gear box thereof.

The mechanism, when broadly considered, consists of a low speed, or primary clutch which is adapted to initiate the drive through a torque multiplying mechanism, a high speed or secondary clutch which is adapted to establish a direct drive between the prime mover and the load when the latter has been accelerated to a predetermined speed, and an auxiliary gear box adapted to selectively provide a further amplification of the torque transmitted to the load. The description of the various parts will accordingly be divided into separate parts, so as to facilitate understanding the various phases of the invention. The primary clutch will be considered first.

Primary clutch

A driving shaft 3 is adapted to have rotational efforts applied to it by a suitable prime mover in any desired manner, and in the present instance, it is shown as constituting the crank shaft of an internal combustion engine. The flanged end of shaft 3 is secured to a flywheel 4 by bolts 5, or in any other suitable manner. Bolts 5 extend through aligned apertures in the flywheel and the flange of shaft 3, and have nuts turned thereon.

Shaft 3 is further provided with a bore 6 in which is carried a bearing assembly 7 for supporting the reduced end 8 of a shaft 9. The rear end of shaft 9 is adapted to be journalled in a bearing assembly that will be described hereinafter.

A hub 11 is splined upon shaft 9 and is provided with a flange 12. Operatively secured to flange 12, by means of rivets or the like, is a vibration dampener designated generally by reference character 13, which provides a resilient driving connection between hub 11 and a driven disc 14. This vibration dampener is employed to dampen out any torsional vibrations that may be set up in the crank shaft of the engine, and in view of the fact that it forms no part of the present invention, it will not be further described.

Facings 15 and 16 are secured to opposite sides of disc 14 near its periphery, and they may consist of any material that has the required characteristics to give the correct frictional gripping force, and at the same time has wearing qualities adapting it for this purpose. I prefer, however, to use the types of material which in practice have given very satisfactory results in automatic slipping drive and clutch mechanisms of the "Powerflo" type. One form of material, embodying colloidally associated copper particles and powdered graphite, is disclosed in co-pending application Serial No. 685,603 filed August 17, 1933, and which is particularly suitable for use in the present mechanism. Frictional facings 15 and 16 may be secured to disc 14 in any suitable manner, as for instance by rivets or the like, and they, along with disc 14, will be hereinafter referred to as a driven member.

Facing 15, secured to disc 14, cooperates with the flat driving face of flywheel 4 and is adapted to be frictionally driven thereby. Facing 16, cooperates with a plate 23 which will be hereinafter termed the automatic plate.

Secured to the flywheel rim portion in any suitable manner as for example by bolts 18 (Figure 2) is a cover member 19 which carries on its inner wall driving lugs or key members 21 which are preferably three in number and symmetrically arranged about the inside of the cover. The key members are received in and cooperate with the walls of recess 22 formed in automatic plate 23.

Disposed parallel to plate 23 is a plate 24, and it will be hereinafter referred to as a reaction plate, because it takes the reaction of a speed responsive mechanism in a manner to be presently described. Reaction plate 24 is driven by automatic plate 23 through the medium of a plurality of cap screws 27. Referring particularly to Figure 2, each cap screw 27 is provided with a reduced end 28 that is threaded in automatic plate 23, and the thread employed is preferably of the Dardelet or other self-locking type so as to prevent the cap screws from working loose in operation. Cap screws 27 extend through, and lie in the path of driving engagement with the walls of recesses 29 formed by reaction plate 23, and are encircled by washers 31 and compression spring 32. Spring 32 acts against the head of bolt 27 and reacts against the plate 24 to thereby urge the automatic and reaction plates toward each other at all times, and they will be hereinafter referred to as holdback springs. The holdback spring assemblies are preferably symmetrically disposed in pairs about the periphery of the plate, and in the present instance six are employed. The holdback spring assemblies accordingly establish a driving connection between the automatic and reaction plates, and at the same time resiliently urge them toward each other.

Reaction spring 24 is normally urged toward the flywheel by a plurality of compression springs 35, which are retained in position against plate 24 by means of depressions 36 formed in the latter. Springs 35 react against the surface of cover 19, and are centered thereon by means of pressed out portions 37 formed in cover 19. Springs 35 are preferably six in number and are disposed in substantially common radii with the holdback assemblies. Reaction plate 24, however, is normally held in the position shown in Figure 1, against the action of springs 35, when the driving shaft is operating at or below the idling speed of the engine or other prime mover, by means of a throwout mechanism that will presently be described.

The automatic and reaction plates may be actuated away from each other by any suitable speed-responsive mechanism, to produce clutch engagement, but in the present instance it preferably takes the form of a centrifugally operable mechanism. Preferably three weight levers 41, having integrally formed heads 42, are symmetrically arranged between the pairs of pressure springs 35, and have their heads 42 received in rectangular recesses 43 formed in automatic plate 23.

Each lever 41 is provided with a pair of threaded portions 44 to which is secured a weight element 46 by means of nuts 47.

Levers 41 are of substantial width and extend through recesses 48 formed in reaction plate 24. Heads 42 are provided with flat faces that normally abut the bottoms of recesses 43 when the driving shaft is operating at, or below idling speed, and by the term "idling speed", I mean the particularly desired automatic uncoupling or disengaging speed of shaft 9, and if an internal combustion engine is employed as the prime mover, the idling speed will lie in the neighborhood of four hundred to five hundred revolutions per minute.

Heads 42 are also provided with reaction faces 49 which abut the face of reaction plate 24 at all times, and are designed for fulcruming engagement therewith during operation of the weights.

Heads 42 have their outer sides relieved to provide knife-like edges 50 which are adapted to rock or pivot in the dihedral angles defined by the bottom and outer faces of recesses 43 formed in automatic plate 23.

When shaft 3 is stationary, or is operating at or below a speed corresponding substantially to the idling speed of the prime mover employed to drive it, the parts assume the positions in which they are shown in Figure 1. Heads 42 of levers 41 are clamped between plates 23 and 24 under the influence of springs 35 acting against plate 24 and cap screws 27, and plate 24 is held in the position shown, against the action of springs 35 by means of a throwout mechanism now to be described.

Extending through apertures 51 formed in reaction plate 24, and preferably symmetrically disposed between the weight assemblies, are a plurality (three) of bolts 52 provided with knurled portions which serve to prevent rotation of the bolts with respect to the reaction plate. Referring in particular to Figures 1A and 1B, it will be seen that bolts 52 are provided with slots 56 in the end of the bolts remote from the reaction plate. The exterior of each bolt in this region is threaded as indicated at 57 and is adapted to have threaded thereon a castle nut 58 which may be locked in position upon the bolt by peening the nut within the slot formed in the bolt. Castle nut 58 abuts a washer 59 which in turn is adapted to bear against the cross head 60 of a T-shaped member 61, formed with a stem 62. As will be seen from Figures 1A and 1B, stem 62 is designed to lie within slot 56 adjacent the castle nut 58. Cross head 60 of the T-shaped member is adapted to extend through and outwardly beyond the confines of bolt 52 as shown in Figure 1B. The cross head 60 is relieved as indicated at 63 and 64 to provide knife edges. The knife edge 63 abuts washer 59 within a recess 65 formed in the washer while knife edge 64 serves a purpose to be presently disclosed. Although not shown in the drawings, due to difficulties of illustration, a slight clearance exists between the T-shaped member and the walls of the slot formed in bolt 52, for a reason to presently appear.

Mounted on pins 71 carried by brackets 72 secured to a depressed portion 73 of the cover member 19 is a plurality (three) of clutch fingers 74 each of which at its upper end is provided with bifurcated portions 75, which lie one on each side of bolt 52. One face of each of the bifurcated portions is recessed as shown at 76 and is adapted for contact with knife edge 64 of the T-shaped member. The other edge of each bifurcated portion is rounded as indicated at 77 and is adapted to abut a washer 78 positioned on bolt 52 and spaced from reaction plate 24 by means of a light compression spring 79. Bifurcated portions 75 of the clutch lever are adapted through the T member 61 and castle nut 58 to cause movement of reaction plate 24 toward or away from the flywheel 4 and washer 78 is designed to retract and hold clutch fingers 74 against rattling when they are not under the influence of springs 35.

Bolts 52 and nuts 58 are adapted to partially extend through apertures 81 formed in cover member 19, and the apertures are preferably of a size sufficient to allow a wrench or the like to be applied to nut 58 for adjustment purposes.

Throwout fingers 74 and throwout bolts 52 which are symmetrically disposed about the periphery of the reaction plate are staggered with respect to the centrifugal weight assemblies, and in the present instance three throwout fingers and bolts are employed.

Movement of the inner ends of fingers 74 to the left in Figure 1, through the intermediary of bolts 52, causes actuation of plate 24 away from the flywheel against the action of springs 35 and this in turn produces similar movement of plate 23 because the holdback assemblies hold the two plates in unitary relationship at all times. Conversely, movement of the inner ends of fingers 74 to the right as seen in Figure 1 allows movement of the automatic and reaction plates as a unit toward the flywheel under the influence of springs 35.

Rotation of the throwout fingers in the manner just described is effective to cause reciprocation of throwout bolts 52 in a smooth and even manner by virtue of the fact that each knife edge 63 is at all times in line contact along the same line with recess 65 of its washer 59, and each knife edge 64 is at all times in contact along the same line with recess 76 of its throwout finger. Constant line contact between each knife edge 63 and each washer 59 is insured since neither the knife edge nor the washer undergo any vertical displacement. Constant line contact between knife edge 64 and recess 76 of the throwout finger is insured since recess 76 undergoes only a slight vertical displacement of approximately .004 inch during rotation of the throwout finger, and knife edge 64 is allowed to undergo a similar vertical displacement by virtue of the slight clearance previously described existing between the T member 59 and the walls of slot 56 of bolt 52.

With the throwout levers and bolts disposed in "automatic position" as seen in Figure 1, line contact between knife edge 64 and the throwout lever exists in a perpendicular plane passing through the axis of pin 71. If the throwout fingers are now rotated in a counter-clockwise direction about pin 71 into "conventionally engaged" position, or are rotated in a clockwise direction about pin 71 into "completely released" position, the line of contact existing between knife edge 64 and recess 76 of the throwout finger will be rotated about pin 71 as a center either to the left or the right of the "automatic" position. The angular displacement which the line of contact undergoes in the transition from "automatic" position to "conventionally engaged" position is substantially equal in magnitude to the angular displacement occurring in the transition from "automatic" position to "completely released" position and differs only in the direction in which such displacement takes place with respect to automatic position.

It will be appreciated that when the line of contact between knife edge 64 and the throwout lever undergoes angular displacement from "automatic" position into either of the two positions above described, the line of contact suffers a displacement which may be resolved into horizontal and vertical components. The horizontal component of such displacement is effective to cause reciprocation of throwout bolts 52, and such horizontal component comprises by far the major part of the resultant displacement which occurs. The vertical component of displacement is but very slight, and as previously described is effective to cause the T-shaped member to rock slightly within slot 56 of bolt 52 in effect comprising lost motion. It is thus seen that even minute rocking motion of the throwout fingers is translated into an almost identically equal linear motion of the throwout bolts with substantially no friction as only a slight loss of motion occurs due to the rocking of the T-shaped member within the throwout bolt slots.

Actuation of fingers 74 is effected by means of a throwout assembly that will now be described. Cooperating with curved faces 83 formed on fingers 74 is the flat face of a ball race 84, which cooperates with anti-friction balls 85 disposed between race 84 and a cooperating ball race 86. Ball races 84 and 86 are held in assembled relation with respect to each other by means of a combined retainer and reservoir defining member 87. The bearing assembly is preferably packed with lubricant during assembly. Ball race 86 is rigidly mounted upon a sleeve 88 which is adapted for axial movement on a sleeve 78 mounted concentrically with respect to shaft 9 in a manner to be presently set forth.

A sealing member 90 is secured to sleeve 88 and frictionally cooperates with ball race 84 so as to retain the lubricant in the bearing. Sleeve 88 is provided with lugs 89 which cooperate with throwout fingers 94 rigidly carried by a throwout shaft 95. Shaft 95 is preferably journalled in, and extends outwardly of clutch housing 1, and is adapted to be actuated by mechanism to be hereinafter described.

Although I have disclosed a specific throwout assembly in connection with my invention, it is to be understood that any suitable throwout mechanism having a face that is substantially normal to the clutch axis for cooperating with the inner ends of fingers 74 may be employed if desired, and a thoroughly practical mechanism obtained.

Shaft 95 is preferably adjustably held by any suitable mechanism in such a position that the throwout bearing assembly will hold the parts in the positions in which they are shown in Figure 1 when driving shaft 3 is stationary or is operating at or below a predetermined idling speed of the prime mover utilized therewith when it is desired to obtain normal, or speed-responsive clutch operation. Under these conditions, a clearance exists between the plates and there is accordingly no driving connection between shafts 3 and 9.

Any suitable latch mechanism may be associated with shaft 95 or the clutch pedal for holding shaft 95 in the position shown in Figure 1, but I preferably employ the mechanism disclosed in Figure 5.

As seen in this figure, shaft 95 extends outwardly from housing 1. A clutch pedal 101 provided with a split hub 102 is mounted for rotation with shaft 95 by means of a bolt 103 which rigidly clamps split hub 102 to the shaft. Also mounted for rotation with shaft 95 is a lever 104 which is thereto keyed. A link 105 is secured to the upper end of lever 104 by means of a pin 106. Link 105, provided with a riding face 106 and a latching face 107, extends through an aperture 108 located in, and cooperates with latching edge or portion 109 of a plate 110 secured to the flywheel housing in any suitable manner. Plate 110 is provided with an apertured finger 111 to which a tension spring 112 is secured, the spring at its other end being secured to an apertured member 113 which is swiveled on a pin 114 carried by latch member 105. Spring 112 tends to hold link 105 in contact with latch portion 109 at all times. An actuating wire 115 extends through an aperture in pin 114 and is secured therein in any suitable manner. Wire 115 extends upwardly and is encased in a flexible housing member 117, which terminates short of the latch assembly so that movement of member 105 will not kink wire 115. Wire 115 and housing 117 constitute the well known Bowden wire structure which is led up to the vehicle dashboard 118 and is thereto secured in any suitable manner. Wire 115 adjacent the dashboard is provided with a knob 119 which may be withdrawn to lift latch member 105 with its latching face 107 clear of latch portion 109 of the bracket 110, to effect engagement of the clutch independently of centrifugal action as will now be set forth.

The parts are shown in Figure 5 as they appear when clutch pedal 101 is latched against rotation by means of link 105 and bracket 110. When the parts are held in this position the throwout mechanism assumes the position shown in Figure 1, and if the engine is operating at idling speed, the clutch will be disengaged as shown in this figure. The parts are normally held in this position when the clutch is being utilized as an automatic clutch, and it will accordingly be hereinafter termed "automatic position".

Shaft 95 may be released to allow rotation thereof and reciprocation of the throwout bearing assembly for causing manual engagement or disengagement of the primary clutch by drawing control knob 119 outwardly away from the vehicle dashboard. Such operation lifts link 105 and its latching face out of engagement with latching bracket 110 to allow springs 35 to force plates 23 and 24 to the left as a unit, which brings plate 23 into engagement with the driven member. This results in movement of the throwout assembly to the right and effects rotation of shaft 95.

The parts may then be restored to automatic position by manually depressing clutch pedal 101 and retracting knob 119. The primary clutch may be disengaged at any time, at the will of the operator by depressing the clutch pedal to its fullest extent. During the disengaging operation the riding face of latch 105 rides upon edge 109 of plate 110.

Manual actuation of the clutch pedal for controlling the primary clutch is essential as will be hereinafter pointed out in connection with the operation of the transmission.

*Automatic operation of primary clutch*

Acceleration of shaft 3 slightly above the idling speed of the prime mover does not cause actuation of the weights because springs 32 hold them in check. As driving shaft 3, and flywheel 4 are accelerated to a speed substantially in excess of idling speed, which is determined by the strength of springs 32, the mass of weights 46, the proportions of the parts, and other factors, weights 46 gradually swing or rock outwardly about their knife-edges 50 as axes in response to centrifugal force. As this occurs, reaction faces 49 of heads 42 fulcrum and slide on the face of plate 24, and knife edges 50, by virtue of their engagement and fulcruming action upon the flat bottom surfaces of recesses 43 located in automatic plate 23, force the automatic plate away from reaction plate 24 against the action of holdback springs 32, and into engagement with facing 16 of disc 14, thus causing disc 14 to move axially and bring the facing 15 thereof into contact with the flywheel.

Movement of automatic plate 23 away from reaction member 24 is opposed by holdback springs 32, and therefore weights 46 are held under control. Holdback springs 32, therefore, in addition to predetermining the speed of the mechanism at which automatic engaging operation is initiated, exert a steadying influence upon the clutch parts.

After the driven member is thus frictionally clamped or gripped between automatic plate 23 and flywheel 4 movement of plate 23 is substantially arrested and further rocking movement of weights 46, in response to a further increase in centrifugal force, causes faces 49 of heads 42 to force reaction plate 24 away from the flywheel against the action of springs 35. Movement of plate 24 in this manner causes pressure to slowly build up in springs 35 and a corresponding pressure is built up between the edges 50 of heads 42 and the bottoms of the recesses in automatic plate 23. This action causes the plate pressure to build up comparatively slowly, with the result that the clutch smoothly picks up shaft 9.

When shaft 3 and flywheel 4 attain a predetermined speed the plate pressure builds up sufficiently to establish a non-slipping drive between shafts 3 and 9. This speed is determined by the magnitude of the torque transmitted by the clutch, as under heavy loads, the speed will be higher than that required to establish a non-slipping drive when the load is light. When a still higher predetermined speed is attained, weights 46 rock out into contact with flanges formed on plate 38, and are thereby arrested.

My mechanism embodies a selective transmission and a semi-automatic transmission arranged in series, and in order to distinguish the two in the description, the former will be termed the selective gear box and latter will be termed the transmission although it is understood that this terminology is purely arbitrary.

*Selective gear box*

With continued reference to Figure 1, housing 1 is joined at its rear end to a housing 128 which encloses the rear portion of the automatic transmission, and is secured thereto in any suitable manner as for example by bolts 129. Sleeve 78, which supports the throwout bearing assembly of the primary clutch, is at its rear end provided with a flange 131 which is secured to housing 128 in any suitable manner as for example by means of bolts 132. Housing 128 is provided with inwardly extending partition forming walls 134 which are adapted to accommodate a ball bearing assembly 135 designed to support an enlarged portion 136 of shaft 9.

A snap ring 138 is designed to be accommodated within a groove formed in the outer race of ball bearing assembly 135, and the outer circumferential portion of the snap ring is accommodated between the flange 131 of sleeve 78 and the partition forming wall 134. The outer race of bearing assembly 135 is thus retained in position with respect to the transmission housing by the action of split ring 138 and further by the abutting action of flange 131 which overlaps the outer bearing race. Received in a groove formed in enlarged portion 136 of shaft 9 adjacent the inner race of ball bearing assembly 135 is a snap ring 139. The inner race of the ball bearing assembly is thus maintained in proper axial position upon shaft 9 by the action of the split ring and the enlarged portion 136 of shaft 9.

The portion of shaft 9 which extends into housing 128 is enlarged and provided with external teeth 142 and internal teeth 143.

Enlarged portion 136 of shaft 9 is provided with a bore 144, designed to accommodate the reduced end 145 of a shaft 146. Reduced portion 145 is journalled in bearings 147 which are adapted to receive lubrication from bearing 135 by means of an oil groove 148 formed in portion 136 of shaft 9. The rear end of shaft 146 is supported in a manner to be presently described. Shaft 146 is provided with splines 151, and bearings 147 are adapted to be positioned away from the splines by means of a spacer ring 152.

Rotatably mounted upon the rear portion of splines 151 is a hub 153, provided with external teeth 154, and having a forward extension 155 provided with internal teeth 156. The forward wall of hub 153 is adapted to abut a collar 157 mounted on splines 151 and which in turn abuts a snap ring 158 accommodated within a groove formed in the splines, the hub 153 in this manner being prevented from displacement in a forward direction on shaft 146.

Splined on shaft 146, between hub 153 and the expanded portion 141 of shaft 9 is a sliding clutch 161 provided with a flange 162 having an enlarged groove 163 for receiving the fingers of a shifter fork to be presently described. The forward portion of sliding clutch 161 is provided with external teeth 164 and the rear portion thereof is provided with external teeth 165, the teeth 164 being adapted to mesh with internal teeth 143 formed on expanded portion 141 of shaft 9, and the teeth 165 being adapted to mesh with the internal teeth 156 formed on hub 153. With the parts disposed in the position shown in Figure 1, sliding clutch 161 is disposed in its neutral position, neither teeth 164 nor 165 cooperating with the internal teeth just described.

External teeth 142 formed on the expanded portion 141 of shaft 9 are adapted to mesh with teeth 168 formed on a cluster gear member 169, which is also provided with teeth 171 adapted to mesh with external teeth 154 formed on hub 153. Member 169, to the rear of teeth 171, is provided with further teeth 173 for a purpose that will presently appear. Member 169 is journalled by means of bushings 174 and 175 upon a counter shaft 176 disposed parallel to shaft 146 and at its forward end received in partition forming wall 134 of housing 128, its rear end being secured against rotation in a manner to be presently described. The forward end of collar 169 is spaced from partition forming wall 134 by means of a thrust washer 179.

Keyed to shaft 146 to the rear of splines 151 is a gear 181 provided with external teeth 182 which lie in the plane of teeth 173 formed on collar 169 and are adapted to be geared thereto by means of an idler reverse gear to be presently described. Gear 181 is spaced from hub 153 on shaft 146 by means of thrust washer 183, and is thus prevented from displacement in a forward direction. The rear face of gear 181 abuts an enlarged portion 184 of shaft 146, which prevents displacement of gear 181 rearwardly. Portion 184 of shaft 146 is journalled in a ball bearing assembly 185 received within a partition forming wall 186 which extends inwardly from housing 128. The inner race of bearing 185 is retained in position by means of a snap ring 187 accommodated in a groove formed within enlarged portion 184 of shaft 146 and an enlarged portion 188 of shaft 146. The outer race of bearing 185 is retained in position by means of a snap ring 189 received in a groove in the outer bearing race, and a plate member 191, which is secured to the partition forming wall in any suitable manner, as for example by bolts 192 and which extends inwardly into overlapping relation with the outer race. The outer portion of plate 191 extends into a recess 193 provided in the rear portion of shaft 176 previously described and is effective in this manner to prevent rotation of said shaft. Concentric about shaft 176 and lying against partition forming wall 186, is thrust washer 194 which is adapted to space collar 169 from the partition forming wall.

From the structure thus far described, it will be readily appreciated that when shaft 9 rotates external teeth 142 formed thereon will drive gear 168 to cause rotation of member 169 about stationary shaft 176. Rotation of member 169 is accordingly effective to produce rotation of teeth 171 thereon formed which mesh with teeth 154 and thereby cause rotation of hub 153. Thus any rotation of shaft 9 is effective to cause simultaneous rotation of collar 169 and hub 153.

With the parts disposed in the position shown in Figure 1, rotation of the elements in the manner just described is ineffective to cause rotation of shaft 146, due to the fact that hub 153 is freely mounted upon shaft 146. However, should sliding clutch 161 be reciprocated in a forward direction so as to bring external teeth 164 thereon formed into meshing engagement with teeth 143 formed on shaft 9, any rotation of shaft 9 would be effective to cause rotation of shaft 146 since teeth 143 and 164 would act in effect as keys to lock shafts 9 and 146 for unitary rotation. During such operation, collar 169, of course, rotates and causes hub 153 to merely "idle" about shaft 146, as there is no driving connection between hub 153 and shaft 146.

If, however, with the parts disclosed in the positions disclosed in Figure 1, sliding clutch 161 is reciprocated rearwardly to bring external teeth 165 thereon into meshing engagement with internal teeth 156 formed on hub 153, rotation of shaft 9, by means of teeth 142 and 168, and in turn through the medium of teeth 171 and 154, will be effective to cause rotation of hub 153 through a speed reduction gear ratio. As hub 153 is effectively keyed to shaft 146 by means of teeth 156, 165 and splines 151, any rotation of the hub is effective to transmit torque to shaft 146. Thus, under these conditions, rotation of shaft 9 produces rotation of shaft 146 and torque transmitted to shaft 146 is amplified since gear 142 is of less diameter than gear 168 and gear 171 is of less diameter than gear 154.

Although I have illustrated a gear box having a single forward gear reduction, and I prefer to use this arrangement, it is to be understood that if desired a further set of gears may be provided to give either a further gear reduction or an overdrive ratio, without departing from the spirit of my invention.

In either of the two selected operations just described, which are effective to cause simultaneous rotation of shaft 146 with shaft 9, it is seen that shaft 146 rotates in the same direction as shaft 9. If, however, it is desired to cause shaft 146 to rotate in a direction the reverse of the direction in which shaft 9 is rotating, this may be accomplished through the medium of collar 169 and gear 181, which may be selectively caused to rotate simultaneously by means of a reverse idler gear, to be presently described. The shifter mechanism for actuating sliding clutch 161 will now be described together with the reverse shifter mechanism and controls therefor.

Figure 7:
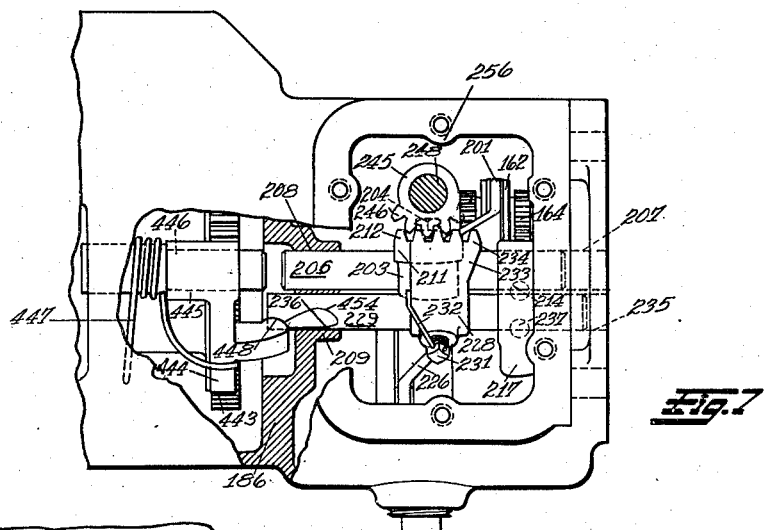
Figure 7 is a view partly in section and partly in elevation as seen when looking from the right of Figure 6, with certain of the parts thereof omitted for clarity of illustration.

With continued reference to Figure 1, and with reference to Figures 6 and 7, it will be seen that sleeve 161 is adapted for cooperation with a shifter fork 201, provided with fingers 202, which are disposed within groove 163 formed in sliding clutch 161. Shifter fork 201 is provided with a hub 203 which is adapted, by means of a set screw 204, to be rigidly secured to a shaft 206. The end of shaft 206 disposed toward the forward end of the transmission, is adapted to reciprocate within a bore 207 formed in partition wall 134 of transmission housing 128. The end of shaft 206 disposed toward the rear of the transmission is adapted to reciprocate within a bore 208 formed in a boss 209 on partition wall 186. Hub 203 of the shifter fork is provided with an extension 211, which at its upper extremity is formed into a gear rack 212.

Shaft 206 is adapted to be selectively retained in its selected longitudinal positions with respect to the transmission housing by means of a ball detent 214 located within a bore 216 formed in an extension 217 integral with transmission housing 128. Ball 214 is urged by a spring 215 into any one of three longitudinally spaced depressions 213 formed on shaft 206. The depressions correspond to direct drive, neutral and geared drive.

In Figure 6, gears 181, 173 and a reverse gear presently to be described are indicated for clarity of illustration in phantom lines, to show their position with respect to each other, although the gears do not actually lie in the plane of the illustration, but are located in fact between the observer and the plane of the illustration.

Positioned parallel to shaft 146 and 176, and disposed in the same horizontal plane with shaft 176 is a shaft 221 having its forward end supported in a web 220 extending inwardly from housing 128 and at its rear end supported in a manner similar to countershaft 176, with its rear end locked against rotation in partition wall 186. Mounted for rotation and reciprocation on shaft 221 is a sliding clutch 222 comprising a collar 223 and a gear 224. This gear will hereinafter be termed the reverse idler gear. Reverse clutch 222 is mounted for reciprocation on reverse shaft 221 by means of a bushing 225. Cooperating with collar 223 of the reverse gear is a shifter fork 226 provided with fingers 227. Shifter fork 226 is provided with a hub 228, which is rigidly mounted for movement with a shaft 229 by means of a set screw 231, which is held in set position by means of a wire 232 extending about a projection 233 formed on hub 228. Projection 233 extends upward in parallel relation to projection 211 of hub 203, and terminates in a gear rack 234, which is disposed in the same horizontal plane as gear rack 212. Shaft 229, as seen in Figure 7, is at its forward end adapted to reciprocate within a bore 235 formed in partition wall 134 and at its rear end is adapted for reciprocation in a bore 236 formed in boss 209 of partition wall 186. Shafts 229 and 206 are thus mounted for similar reciprocation with respect to transmission housing 128.

Shaft 229 is adapted to be selectively positioned with respect to the transmission housing by means of a ball detent 237 located in a bore 238 formed in extension 217 previously described, and is urged by means of a light compression spring 239 into any one of two depressions 241 formed on the shaft. The ball detent assembly just described is similar both in structure and function to the ball detent assembly described in connection with shaft 206, but is provided with only two depressions corresponding respectively to neutral and reverse position. From the structure thus far developed, it will be apparent that selective positioning of sliding clutch 161 may be effected by lateral displacement of gear rack 212, which by virtue of its rigid connection with shaft 206, causes displacement of the shaft into selected position where it is yieldingly maintained through the medium of ball detent 214.

As will be readily appreciated from an inspection of Figure 1, sliding clutch 161 may be disposed in any of three positions. With the parts disposed as shown in Figure 1, the clutch is disposed in what will be known as "neutral" position, while if the clutch be shifted until teeth 164 thereof mesh with teeth 143 of shaft 9, it will be disposed in what will be known as "high" position, and if the clutch be disposed with teeth 165 thereof in meshed engagement with teeth 156 of hub 153, it will be disposed in what will be known as "low" position. As there are three selective positions for sliding clutch 161, three depressions 213 are formed in shaft 206 in order that detent 214 may hold shaft 206 in any one of the three selected positions.

Referring now to the mechanism for establishing reverse drive of shaft 146, it will be appreciated that reciprocation of the reverse clutch 222 may be effected by lateral displacement of gear rack 234 and shaft 229 rigidly assembled therewith. Thus it is possible to bring reverse gear 224 into meshing engagement with gears 173 and 182 or to bring gear 224 out of engagement with said gears. It will therefore be appreciated that there are only two selective positions for the reverse sliding clutch 222, and in consequence it is necessary to provide only two depressions 241 in shaft 229 in order that detent 237 may retain shaft 229 in either of its selected positions.

With reverse clutch 222 disposed in the position disclosed in Figure 1, the clutch will be said to be in its "neutral" position. However, should the collar 222 be disposed so as to bring gear 224 into engagement positively with gears 173 and 182, the reverse collar 222 will be said to be disclosed in its "positive" position.

From the reverse structure thus far described, it will be readily apparent that if sliding clutch 161 be disposed in "neutral" position, that is the position indicated in Figure 1, and the reverse sliding clutch 222 be disposed in its "positive" position, rotation of shaft 9 is effective through teeth 142 and 168 to cause rotation of collar 169 in a reverse direction and this collar, by means of teeth 173 and reverse gear 224 is effective to cause rotation of the reverse idler gear in the same direction as shaft 9 is rotating. Rotation of gear 224 in this direction is effective through teeth 182 to cause rotation of gear 181 in a reverse direction with respect to shaft 9 and, as gear 181 is keyed to shaft 146, such rotation of gear 181 will be effective to cause shaft 146 to rotate in a reverse direction with respect to shaft 9. It will thus be appreciated that by proper manipulation of gear racks 212 and 234, shaft 9 may be made to cause shaft 146 to rotate in a direction imparting reverse drive to the wheels of the vehicle.

Actuation of gear racks 212 and 234 in the manner just described is effected by means of a segmental pinion gear 245 provided with teeth 246, which by means of a pin 247 is secured on the reduced end of a shaft 248. Shaft 248 is adapted to be reciprocated and rotated within a bore 249 formed in a cylindrical housing 251. Shaft 248 and gear segment 245 are urged to the left as seen in Figure 6 by means of a spring 252, disposed within bore 249, and which at one end bears against a shoulder 253 formed on cylindrical housing 251 and at its other end bears against a shoulder formed on shaft 248.

Cylindrical housing 251 is integrally formed with a cover plate 254 which is adapted to be secured to bosses 256 formed on housing 128 in any suitable manner as for example by bolts 257 or the like. Cover 254 is spaced from bosses 256 by means of a gasket member 258. It will thus be apparent that plate cover 254 is effective to close aperture 260 formed within the transmission housing 128. However, by the simple expedient of removing bolts 257 and withdrawing cover plate 254 from the transmission housing, opening 260 will be exposed, and access may be had therethrough to the high and low shifter mechanism or to the reverse shifter mechanism previously described for adjustment or servicing.

Cylindrical housing 251 adjacent its end remote from transmission housing 128 is enlarged to form a casing member, indicated at 261. The reduced end 262 of shaft 248 extends into the casing 261, and by means of a pin 263, a sector gear 264 is secured onto the reduced shaft end. Sector gear 264, having a gear track 265, is provided with a flange 266 which lies adjacent one side of the gear rack. The other side of the gear rack is enclosed by a plate member 267 which is secured to sector member 264 in any suitable manner. Plate member 267 extends below the reduced end 262 of shaft 248 as seen at 268 and is provided with an arcuately formed recess 269.

A boss 275 is formed on the inside of casing 259 and held there-against is a disc member 276 which is retained in place by means of a bolt 277 having a nut 278 threaded thereon.

With the parts disposed in the position shown in Figure 6, it will be appreciated that rotation of sector member 264 will be effective to cause rotation of shaft 248, to which the sector member is secured, and segmental gear 245. Such rotation of gear 245 when teeth 246 and 212 are in meshing engagement as shown in Figure 6 is effective to cause displacement of the shifter fork 201 into its various operative positions in the manner previously described. Should it be desired however to effect displacement of the reverse shifter fork 226, it is only necessary to cause lateral displacement of shaft 248 to the right (as shown in Figure 6) until teeth 246 of gear 245 are meshed with gear rack 234. Rotation of shaft 248 under such conditions is accordingly effective to cause selective displacement of reverse shifter fork 226. It will be observed that under ordinary conditions gear 245 is urged to the left (as seen in Figure 6) by virtue of the fact that compression spring 252 constantly tends to displace shaft 248 to the left.

Rotation and reciprocation of shaft 248 within bore 249 in the manner just described may be effected by means of sector gear 264 in a manner to be now described.

To housing section 261 is secured a mating section 281 adapted to house the assembly for actuating gear sector 264 and secured to section 261 in any suitable manner, as for example by means of cap screws 282 or the like. Extending inwardly from the wall of section 281 is a longitudinal boss 283 having a bore 284 adapted to accommodate, for reciprocation and rotation therein, a cylindrical rack member 285 on which are formed rack teeth 286 designed for meshing engagement with the teeth of sector gear 264.

One end of housing 261 is provided with an opening 287 to facilitate access to the interior of the housing during manufacture, and this opening is adapted to be closed by means of a cover 288 which is secured in place within the opening.

Rigidly secured to one end of the cylindrical gear rack, by means of a recessed soldered connection, is a control cable 290 which enters housing 281 by way of a sheath anchoring assembly 291. Control cable 290 is specially constructed so that it possesses substantially no torsional deflection under the loads to which it is subjected, and as cables of this character are known in the art, it will not be further described. Control cable 290 enters a sheath 293 and is led up to the vehicle dash-board. Adjacent the vehicle dash-board, the cable is rigidly connected to a control knob 294. Control knob 294 is connected to a plunger 295, to which cable 293 is secured in a manner similar to its connection to rack 285, and plunger 295 is mounted for reciprocation and rocking movement in a bracket 296. The latter is connected to the vehicle dash 297 by means of a resilient bushing 298, so as to prevent transmission vibrations from being communicated to the dash instruments, a pin 299 connected to plunger 295 and working in an enlarged slot in bracket 296 is operable to prevent excessive strains being set up in cable 290 through improper actuation of knob 294. Tube 293 extends into bracket 296 and is adjustably related thereto by means of a nut and screw assembly 300, for securing the proper working length of the cable after the device has been installed in the vehicle.

Control knob 294 may be either rotated upon manual twisting thereof by the vehicle operator or may be reciprocated toward and away from the vehicle dash-board and such actuation of the knob is effective, through the medium of control wire 290, to cause corresponding rotation or reciprocation of cylindrical rack 285 within bore 284.

Rotation of cylindrical rack 285 within its bore results in lateral displacement or reciprocation of sector gear 264 since under such conditions teeth 286 on the cylindrical rack, which are in meshing engagement with teeth 265 on the sector gear, are urged into abutting engagement with either flange 266 or plate 267 which enclose opposite sides of gear track 265, and in this manner will cause reciprocation of the sector gear and shaft 248 into either of their operative positions.

Reciprocation of cylindrical rack 285 within its bore results in rotation of sector gear 264, since under such conditions the elements cooperate as a simple rack and pinion for translating linear motion into rotary motion.

Rotation and reciprocation of cylindrical rack 285 in the manner just described is thus effective through the medium of sector gear 264 to cause corresponding rotation and reciprocation of shaft 248 with resulting actuation of the control shafts 206 or 229 in the gear box and selective conditioning of the latter for transmission of torque therethrough. Thus it will be appreciated that conditioning of the gear box is at all times under the complete control of the vehicle operator who may at will selectively actuate knob 294 on the vehicle dash-board for any condition of torque transmission through the gear box.

With the parts of the mechanism disposed in the position shown in Figures 6 and 8, reciprocation of shaft 248 within bore 249 may be readily effected. It will be appreciated, however, that if sector member 264 should be rotated so that recess 269 in plate 267 would no longer be aligned with disc 276, reciprocation of shaft 248 lengthwise within bore 249 would be prohibited as plate 268 would abut disc 276. It is thus seen that reciprocation of shaft 248 is prevented unless sector member 264 and plate 267 thereto fastened is disposed in the particular angular position shown in Figure 8, with recess 269 aligned with disc 276.

However, with the parts disposed in the position shown in Figures 6 and 8, shifter fork 201 is in its "neutral" position and it is thus seen that shaft 248 may not be reciprocated to bring gear 245 into meshing engagement with gear rack 234 to cause actuation of the reverse shifter fork 226 to positive reverse position unless shifter fork 201 is disposed in its neutral position. It is therefore impossible to shift the parts into reverse drive unless sliding clutch 161 is in its neutral position.

It will further be appreciated that if shaft 248 and gear 245 are in meshing engagement with gear rack 234 to dispose reverse shifter 226 in reverse position, it will be impossible to reciprocate shaft 248 in bore 249 until the reverse shifter fork 226 is brought into its neutral position. The mechanism just described therefore comprises an automatic and fool proof interlock for preventing both the forward and reverse shifter forks and sliding clutches from being disposed simultaneously in positive operative position because of carelessness or inadvertence on the part of the vehicle operator.

*Automatic transmission and related mechanisms*

The enlarged portion 188 of shaft 146 is provided at its rear extremity with external teeth 301, and is provided with a bore 302 in which is journalled, by means of bearings 303, the reduced end portion 304 of a shaft 305. Shaft 305 at its rear extremity is supported in a bearing in a manner to be hereinafter disclosed. Shaft 305, to the rear of reduced portion 304, is provided with a preferably integrally formed external gear 306, which is spaced from needle bearings 303 by means of a ring 307.

Disposed concentrically about the rear portion of shaft 146 and the forward portion of shaft 305 is a pinion carrier or cage member 309, the forward portion 310 of which is mounted for rotation about enlarged portion 188 of shaft 146 by means of roller bearings 311. Bearings 311 provided with an outer race 312, are spaced from ball bearing assembly 185 by means of a bearing guard 313, and are spaced from gear teeth 301 by means of a bearing guard 314. The rear portion 317 of cage member 309 extends inwardly toward shaft 305 to form a hub, and an oil seal assembly 318 is secured to cage 309 and sealingly cooperates with shaft 305 to prevent lubricant from working therebetween and getting into the secondary clutch chamber. Seal 318 may be of any suitable form, and as it per se forms no part of the present invention, it will not be further described.

Cage member 309 is provided with preferably two openings 322 in each of which is disposed a gear member 323 mounted for free rotation about a shaft 324 by means of a bushing 325. Each shaft 324 is secured at both its forward and rearward end within the cage member 309 with a friction fit, as indicated at 326. Each gear member or pinion 323 is spaced from the walls of cage member 309 by means of anti-friction discs 327 and 328 respectively, and is provided with external teeth 331, which are adapted for meshing engagement with external teeth 301 formed on the rear end of shaft 146. Pinion 323 is further provided with external teeth 333 which are adapted to mesh with teeth 306 formed on the forward end of shaft 305. Lubrication of bushing members 325 is effected by means of an oil slot 335 formed in pinions 323.

Gears 301, 306, 331, and 333 may be of the common spur variety of desired, but I preferably employ helical gears so as to promote quietness of operation. Although it is possible to design the gears so that the axial thrusts set up thereby completely balance each other, I preferably so design the gears that there is a slight unbalance of thrust applied to cage 309, because if the thrusts were completely balanced or "neutralized", the assembly would possibly have a tendency to "float", and produce noise.

Rotatably mounted in housing 128 by means of a bearing 341 and piloted on cage member 309 is a cylindrical sleeve 343, which is secured to cage 309 by means of cap screws 342. Sleeve 343 is concentric with and spaced from shaft 305 and both the inner and outer faces of sleeve 343 are cylindrical in configuration.

Concentric with sleeve 343, as seen in Figure 3, is a collar member 344 provided with internal bosses 345 having camming faces 346. Disposed between each camming face 346 and the exterior face of sleeve 343 are roller members 347. Collar 344 is closely fitted in a cylindrical housing or support 348, which is flanged as shown at 349. Flange 349 is piloted in a cylindrical recess 350 formed in transmission housing 128, and is secured to the latter in any suitable manner, as for example by cap screws 351 or the like. In order to prevent fluid leakage between flange 349 and housing 128, a gasket member 352 is preferably interposed therebetween. Collar or clutch race 344 is locked against rotation in its support 348 by means of a plurality of keys which take the form of three pins 355 (Figure 3) disposed in recesses in the two parts.

As seen in Figure 3, each roller 347 is urged in a counter-clockwise direction by means of a plunger 362, received within a cylindrical sleeve 363 accommodated in a bore 364 formed in collar member 344. Each plunger 362 is provided with a head 363 adapted to abut its corresponding roller 347. Each plunger and head is urged away from sleeve member 363, for urging each roller into engagement with its camming face, by means of a light compression spring 365.

The rear end of support 348 is provided with an oil seal assembly 356 which sealingly cooperates with the outer surface of sleeve 343 to prevent lubricant leakage between housing 348 and sleeve 343. Collar or clutch race 344, and the outer race of bearing 341, are respectively prevented from displacement in a forward direction by means of a snap ring 357 accommodated in a groove formed in housing 348. A shoulder 358 formed on sleeve 343 prevents rollers 347 from shifting forwardly. Collar 344 is prevented from displacement rearwardly by abutting contact with the ball bearing assembly 355, the outer race of which is adapted to abut a shoulder formed on housing 348, and the inner race of which is adapted to abut a snap ring 359 accommodated in a groove in sleeve 343. Sleeve 343 is prevented from shifting rearwardly in bearing 341 by means of a snap ring 360 which is sprung into a groove located in sleeve 343 and engages the front face of bearing 341.

From the structure thus far described, and with attention directed particularly to Figure 3 of the drawings, it will be appreciated that if sleeve 343, and cake or spider 309, which will be hereinafter collectively termed the carrier, tends to be rotated in a counter-clockwise direction with respect to collar 344, rollers 347 will be wedged between the exterior face of sleeve 343 and the camming face 346 of collar 344. Under such conditions, with the rollers wedged as just described, sleeve 343 is locked against counter-clockwise rotation and such action occurs under certain special conditions of operation to be hereinafter disclosed in detail.

If, however, sleeve 343 should tend to be rotated in a clockwise direction with respect to collar 344, rollers 347 will tend to disengage themselves from camming surface 346 against the action of plungers 362 and will be urged out of wedging engagement between sleeve 343 and collar 344. Under such conditions sleeve 343 will be allowed to rotate freely in a clockwise direction with respect to collar 344, and such action occurs under normal operating conditions to be hereinafter described.

Since under normal operating conditions, sleeve 343 is rotated in a clockwise direction, and since the surface of sleeve 343 which is in contact with rollers 347 is cylindrical in configuration, it will be appreciated that no wear occurs between sleeve 343 and roller 347 under normal conditions of operation, as it has been found that a wedge of oil is formed in front of each roller and substantially lifts it free and away from engagement with sleeve 343. This is made possible by locating the rollers in a stationary member, so that they will not manifest centrifugal forces, and by using comparatively light springs for actuating the rollers. This feature is of great importance and marks a distinct advance over prior overrunning clutches or free wheeling units, which under normal conditions of operation allow wear to take place between the free wheeling rollers and the rotating parts, with the result that their usefulness is greatly impaired.

Briefly, the operation of the torque multiplying mechanism is as follows: When rotational tendencies are transmitted through the primary clutch and the gear box to rotate shaft 146 in a clockwise direction as viewed from the left of Figure 1, pinion 301 formed on the rear end of shaft 146 tends to cause counter-clockwise rotation of planetary pinion 323, and, by means of gear 306 formed on the forward end of shaft 305, to cause the planetary pinion to planetate rearwardly or counter-clockwise about gear 306 which is initially held stationary by the load. The resulting tendency of cage 309 to rotate in a counter-clockwise direction is prevented, however, by means of one-way clutch rollers 347 in the manner previously described.

Accordingly, counter-clockwise rotation of planetary pinion 323 therefore causes clockwise rotation of gear 306 and shaft 305. Torque is thus transmitted through the torque multiplying mechanism, and as gear 301 is of less diameter than gear 331 of the planetary pinion, and gear 333 of the planetary pinion is of less diameter than gear 306, it will be appreciated that torque transmitted from shaft 146 to shaft 305 in the manner just described undergoes a double amplification.

After the load has been started and attains a predetermined speed under the influence of the torque multiplying drive just described, the transmission may be shifted to establish a direct drive between shafts 146 and 305, and the mechanism employed for effecting this result will now be described.

Secondary clutch mechanism

Secured to the rear face of sleeve 343, and mounted for rotation therewith in any suitable manner, as for example by bolts 370, is a web 371 of a flywheel-like member 372. Positioned within the flywheel and mounted concentrically about shaft 305 is a plate 373 which will hereinafter be termed the automatic plate.

Automatic plate 373 is adapted for rotation with flywheel 372 and for longitudinal reciprocation therein by means of internal splines 383 formed on the flywheel and external splines 384 formed on the automatic plate, which mesh therewith.

Threaded into self-locking engagement in plate 373 as indicated at 374, and extending outwardly through openings 375 in the web of the flywheel and through disk plates 376 covering openings 375 is a plurality of bolts 377 which will hereinafter be termed "holdback bolts". Each holdback bolt 377 is provided with a head 378 against which bears a compression spring 379 that encircles bolt 377 and the other end of which bears against plate 376 previously described. The holdback bolt assemblies are preferably symmetrically disposed in pairs about the periphery of plate 373 and in the present instance, six may be employed. It will thus be appreciated that automatic plate 373 is at all times urged toward the flywheel web by means of springs 379.

Mounted upon a splined portion 385 of shaft 305 is a hub 387 provided with a flange 388 to which is secured in any suitable manner as for example by rivets 389 or the like, a disc member 390, the outer portion of which is disposed in parallel relation to automatic plate 373.

Facings 391 and 392 are secured to the opposite sides of the disk 390 and they may consist of any material that has the required characteristics to give the correct frictional grip, but they are preferably similar to facings 15 and 16 employed with driven disc 14 of the primary clutch.

Facing 391 is adapted to cooperate with the rear face of automatic plate 373, and facing 392 is adapted to cooperate with the front face of a plate 393 which will be hereinafter termed the "floating" plate.

The floating plate is adapted for rotation with flywheel 372 and for reciprocation therein by means of external splines 394 formed on the floating plate which cooperate with the internal splines 383 formed on the flywheel as previously described.

A cover member 396 is located at the rear face of flywheel 372 and is secured thereto in any suitable manner, as for example by means of bolts 397 or the like. Through apertures 398 formed in cover 396 extend a plurality of bolts 399, each of which is provided with a reduced portion 401 which is threaded into self-locking engagement with floating plate 393. Bolts 399 may be equal in number to and disposed in opposite relation to bolts 377 threaded in the automatic plate, six bolts thus being employed. Each bolt 399 is provided with an enlarged head 402 which is greater in diameter than the aperture 398 in the cover member, and bolt 399 is in consequence prevented from lateral displacement further to the left of its position as seen in Figure 1, by virtue of the abutting relation existing between heads 402 of the bolts and cover plate 396. A plurality of washer-like shims 403 are preferably disposed between the heads of bolts 399 and cover 396 for adjustment purposes. Disposed between the floating plate 393 and the cover member 396 are a plurality of compression springs 405 adapted at one end to be received within recesses 406 formed in the floating plate, and at their other end adapted to be received in recesses 407 formed in the cover member. Springs 405 are preferably six in number and may be symmetrically disposed in pairs about the periphery of the floating plate and staggered with respect to bolts 399. It will be readily appreciated that compression springs 405 tend at all times to urge the floating plate 393 to the left as seen in Figure 1, away from the cover member 396. As just described, however, bolts 399 are effective to prevent more than a predetermined movement of plate 393 away from cover member 396 by virtue of the fact that heads 402 of bolts 399 abut the cover plate.

From the structure thus far described, it will be appreciated that automatic plate 373 and the web portion 371 of the flywheel are at all times urged together by means of compression spring 379 in the manner previously described. It will further be appreciated that floating plate 393 is at all times designed to be urged away from cover member 396 by virtue of the action of compression springs 405. With the engine dead or idling at very low speeds, the parts may be disposed in the position disclosed in Figure 1, and under such circumstances, driven disc 390 has no torque transmitted to it through either the automatic plate 373 or the floating plate 393, by virtue of the fact that a clearance exists between facing 391 and the automatic plate 373. This clearance corresponds substantially to the idle release clearance of the primary clutch, previously described.

The automatic plate may be urged away from web portion 371 of the flywheel in any suitable manner to produce clutch engagement, but on the present embodiment of my invention it preferably takes the form of a centrifugally operable mechanism similar to that disclosed in connection with the primary clutch, and as the centrifugal mechanism of the secondary clutch is similar to the centrifugal mechanism previously described in connection with the primary clutch, only brief description thereof will be made.

Preferably three weight levers 411 provided with heads 412 having knife edges 413 are received within recesses 414 formed in the automatic plate. Levers 411 extend through rectangular slots 415 formed in the flywheel web, and at their other ends carry weight assemblies 416 secured thereto by means of nuts 417 or the like. The face of each head 412, remote from the bottom of recess 414, is indicated at 418 and reacts against the web of the flywheel. With the flywheel operating at or below a predetermined speed, the force exerted by compression springs 379 will be ample to prevent movement of the automatic plate 373 away from the web 371 of the flywheel. Under these conditions, heads 412 of the centrifugal weight assemblies will be held in the position shown in Figure 1, and a clearance will exist between automatic plate 373 and the driven disc 390, and also between plate 393 and the driven disc clearance may exist.

The rear end of shaft 305 is supported in the ball bearing assembly 421 supported in a cover member 422 secured to the rear end of transmission housing 128 by cap screws 423 or the like. Bearing assembly 421 is retained in position with respect to housing 422 by means of a split ring 424. The inner race of the bearing assembly is maintained in position on the splined portion 385 of shaft 305 by means of a split ring 425. Also splined upon shaft 305 is a worm gear 427 adapted to drive a pinion gear 428 connected with the speedometer mechanism to indicate the speeds at which the vehicle is travelling. Lubrication of speedometer mechanism 428 and ball bearing 421 is effected by means of a grease fitting 429 connected into cover member 422.

Shaft 305 may be connected to the driven load in any suitable manner, but in the present instance a sleeve 430, provided with a flange 431 is splined upon shaft 305 and is adapted to be secured to the forward universal joint of an automotive vehicle in any suitable manner. Sleeve 430 is retained upon driven shaft 305 by means of a nut 432 threaded upon the end of shaft 305 and retained in adjusted position by means of a cotter pin indicated at 434. Nut 432 forces sleeve 430, gear 427 and bearing 421 to the left and brings the inner race of bearing 421 into tight engagement with split ring 425. Shaft 305 is accordingly positively fixed against axial displacement in bearing 421, and certain gear thrusts are taken in this manner by this bearing in a manner to be hereinafter set forth. An oil seal assembly 435 is disposed between cover member 422 and sleeve 430 for the purpose of preventing leakage of oil therebetween.

Integrally formed upon rear cover 422 is an apertured lug 436 which is adapted to be secured to a vehicle frame member for supporting the transmission in operative relation to the vehicle.

The operation of the secondary clutch mechanism is briefly as follows: Should the rotational speed of the flywheel exceed a predetermined value, masses 416 will be centrifugally thrown outwardly with the result that levers 411 pivot about knife edges 413 and cause reaction face 418 of each centrifugal head to fulcrum against the web of the flywheel. In this manner, automatic plate 373 is urged away from the web of the flywheel, and as rotational speed of the secondary clutch is increased, weights 416 will swing further outward, automatic plate 373 being displaced further away from the flywheel web until it comes into engagement with facing 391 of the driven disk 390. Upon further increase of the rotational speed of the secondary clutch, masses 416 will swing still further outwardly and automatic plate 373 which is now in engagement with driven disc 390, will urge the latter toward the rear of the clutch until face 392 thereof is in engagement with the floating plate 393.

As the weights 416 swing still further away from shaft 305 into their maximum outward position, automatic plate 373, driven disk 390 and floating plate 393 will together be urged toward cover 394 of the flywheel against the action of compression spring 405. Pressure is thus built up between the plates, and the automatic plate, the driven disc and the floating plate are brought into synchronism without shock.

Since the web of the flywheel is rigidly bolted to the carrier, and since driven disc 390 is splined to rotate with shaft 305 when the automatic plate and the driven disc attain the same angular velocity, cage member 309 and shaft 305 will also be rotating at the same angular speed. Pinion shaft 324, carried by cage member 309, will then revolve about the axis of shaft 305 with the same angular speed with which shaft 305 is rotating about its own axis. When such motion of pinion shaft 324 and shaft 305 is eventuating, it will be appreciated that there can be no rotation of pinion gear 323, as pinion shaft 323, pinion shaft 323 and gear 306 will under such circumstances be rotating as a unit. As a result, teeth 331 on pinion 323 and teeth 301 on shaft 146 act merely to key shaft 146 to the pinion gear and cage unit. It will therefore be readily appreciated that shaft 146 and shaft 305 under such conditions will be rotating at the same angular speed due to the fact that shaft 146, pinion 323, pinion shaft 324 and shaft 305 rotate as a unit at a common angular speed.

The operation just described will occur when the secondary clutch is engaged and a condition of direct drive will exist from shaft 146 to shaft 305. If, however, the parts are disposed in the position in Figure 1 with the secondary clutch disengaged, torque will be transmitted to shaft 146 and shaft 305 through the torque multiplying mechanism including pinion 323 in the manner previously described.

*Pinion carrier lock mechanism*

Under conditions of reverse drive, to be hereinafter described, it becomes desirable and necessary to lock cage member 309, together with the secondary clutch, against rotation. Such result is accomplished by means of the structure about to be described.

Figure 7A:
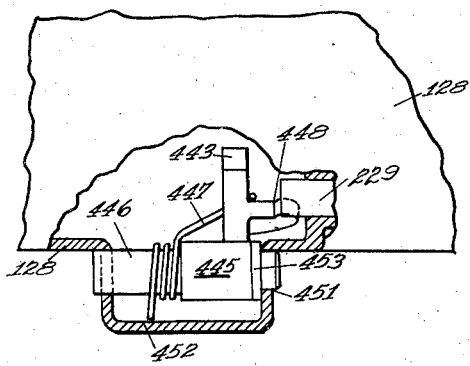
Figure 7A is a fragmental view in section taken substantially on line 7A—7A of Figure 4.

Shrunk upon the forward portion of member 309 is a gear ring 441 provided with teeth 442. Adapted for cooperation with teeth 442 is a detent portion 443 of a lever 444 mounted upon a collar 445 positioned on a shaft 446. A spring 447 constantly urges detent portion 443 toward teeth 442 at all times. However, engagement of detent portion 443 and teeth 442 is prevented under certain conditions by means of an offset 448 formed on lever 444 and which contacts shaft 229, the reverse shifter shaft. As seen in Figure 7A, shaft 446 is accommodated at 451 in the walls of a protuberance 452 formed on housing 128. A spacer 453 positions hub 445 from one wall of protuberance 452, while spring 447 spaces the collar from the other wall of the protuberance.

Reverse shifter shaft 229 is provided with a depressed portion 454 adapted under certain conditions to receive offset 448 to thereby allow spring 447 to effect counter-clockwise rotation of lever 444, as shown in Figure 4 and bring detent portion 443 thereof into engagement with teeth 442 of the planetary cage member.

Referring to Figure 7, it will be seen that with the parts disposed in the position therein disclosed, portion 454 and offset 448 are not in registry. However, upon lateral shifting of reverse shaft 229 to the left as seen in Figure 7, portion 454 thereof will be brought into registry with offset 448 to allow the latter to be received in portion 454 and allow counter-clockwise rotation of shaft 444 as seen in Figure 4, to bring detent 443 into engagement with teeth 442 formed on the planetary carrier member.

With offset 448 received in depression 454 of shaft 229 and with planetary carrier 310 locked against rotation in a clockwise direction as seen in Figure 4, release of carrier 310 may be effected by reciprocation of shaft 229 to the right to move depression 454 out of registry with offset 448 and cause clockwise rotation of lever 444 to bring detent 443 out of engagement with teeth 442. It will therefore be readily seen that locking and unlocking of carrier member 310 is effected by a lateral shifting of reverse shifter shaft 229.

Such reciprocation of reverse shifter shaft 229 is effected as previously described by reciprocation of gear rack 234 to cause movement of the reverse idler gear into or out of its operative position. When shifter shaft 229 is moved to the left as seen in Figure 7, the reverse idler gear is brought into meshed engagement with teeth 173 and 182 to cause positive reverse drive of shaft 305 with respect to shaft 146. Such reciprocation of shaft 229 is simultaneously effective to bring depression 454 thereof into registry with offset 448 and allow detent 443 to mesh with teeth 442 formed on the pinion carrier and thereby lock said carrier against rotation. It will thus be seen that by means of the structure just described, planetary carrier 309 is automatically locked against forward rotation when the idler reverse gear is brought into positive operative position, and the planetary carrier 309 is unlocked and allowed to rotate automatically upon movement of the reverse idler gear into its neutral position. This result is essential to the proper transmission of reverse torque to be hereinafter described.

Before proceeding to a description of the operation of my device, I will briefly describe the action of the gears used in the gear box and transmission. The gears employed in these units may assume any suitable form, but I preferably use helical gears to promote quietness of operation, and as "constant mesh" gear boxes are well known in the art, the action of the gear box gears will be readily understood without further discussion.

With reference to the transmission, gears 331 and 333 are of opposite pitch and are designed so that when they are transmitting power from the engine to the load, the thrust tends to force gears 301 and 306 axially apart, and when the vehicle tends to drive the engine these gears tend to be brought toward each other. The two directional axial thrust applied to gear 301 as a result of the action just described is resisted by bearing 185, which is locked against axial movement in the manner previously described. The axial thrusts applied to gear 306 are taken by bearing 421, which is also locked against axial movement.

Bearings 185 and 421 are designed primarily to sustain radial loads, and loads of this character constitute the major part of the loads imposed thereupon. However, in view of the comparatively deep races with which these bearings are provided, they can efficiently handle axial loads of considerable magnitude and they can accordingly adequately handle the thrusts imposed thereupon by the gears.

As previously explained, the thrusts of the gears are only partially neutralized, with the result that an unbalanced thrust of low magnitude is applied to carrier 309 through thrust washers 327 and 328. The direction of this thrust depends upon the direction of the drive, but it is completely resisted, irrespective of its direction, by bearing 341, which restrains carrier 309 against axial movement in either direction.

When the device is placed in operation, both the gear box and the transmission chambers are supplied with lubricant of suitable grade, and it is allowed to circulate from one chamber to the other through suitable openings in partition 186 (not shown).

General operation

The operation of the mechanism thus far described will now be set forth in detail. Assuming that the parts of the mechanism are disposed in the positions which they will occupy under starting conditions, forward drive sliding clutch 161 and reverse drive sliding clutch 222 of the gear box will be disposed in neutral position as shown in Figure 1. If the engine is now started and operated at a predetermined speed, for example at a speed corresponding substantially to the idling speed of the prime mover utilized therewith, there will be no driving connection between shafts 3 and 9, as the primary clutch will be disengaged as illustrated in Figure 1.

The prime mover may now be warmed up and the driving shaft 3 operated at a speed substantially above idling speed, and although the primary clutch under these conditions will engage, and power will be transmitted from shaft 3 to shaft 9, there will be no transmission of power between shaft 9 and shaft 146 due to the fact that both sliding clutch 161 and reverse sliding clutch 222 in the forward gear box are disposed in their neutral positions, as previously described.

If desired, while warming up the prime mover, the primary clutch may be manually disengaged to prevent transmission of torque to shaft 9 by depressing clutch pedal 101.

Low speed torque multiplying drive

If, under normal conditions it is now desired to start the vehicle in motion, the dash control is manipulated to cause reciprocation of sliding clutch 161 to the left as seen in Figure 1 into its "high" position until teeth 164 thereon are in engagement with teeth 143 of the rear end of shaft 9, and the engine is accelerated. By "normal conditions" I mean with the vehicle located on a substantially level, hard surface.

As the driving shaft is accelerated, the centrifugal weights of the primary clutch fulcrum outwardly in response to centrifugal force and cause the primary clutch mechanism to be engaged in the manner previously described, thereby coupling shafts 3 and 9.

Transmission of torque from shaft 9 to shaft 146 is effected through the medium of internal teeth 143 on pinion 141 formed on the rear end of shaft 9 which teeth are in meshing engagement with external teeth 164 formed with collar 161. By virtue of the fact that collar 161 is splined to rotate with shaft 146, clockwise rotation of pinion 141, as viewed from the left of Figure 1, is effective through teeth 143 and 164 and spline 151, to cause rotation of shaft 146 in a clockwise direction and torque is thus transmitted from shaft 9 to shaft 146.

Simultaneously with such operation, pinion 141 on shaft 9 tends to produce counter-clockwise rotation of gear 169 in the forward gear box by virtue of the fact that shaft 176 on which gear 169 rotates is rigidly supported in the transmission housing. Gear 169 is in meshing engagement with gear 153 which is freely rotatable upon shaft 146, and gear 153 is therefore rotated in a clockwise direction freely upon shaft 146.

Thus under normal starting conditions with the gear box conditioned for direct drive, torque will be transmitted directly and without amplification from shaft 9 to shaft 146.

If, however, it is desired to put the vehicle in motion under conditions which are other than normal, as for example upon a steep grade or with an unusually heavy load, sliding clutch 161 may be reciprocated to the right as seen in Figure 1 into its "low" position until teeth 165 thereof are in engagement with teeth 156 formed on gear 153. As previously explained, such reciprocation of sliding clutch 161 may be effected by means of the dash control assembly described in connection with Figures 6 and 8 of the drawings.

With the parts disposed in this position, clockwise rotative tendencies of shaft 9 as viewed from the left hand end of Figure 1 are, in the manner just described, effective by means of pinion 141 and countershaft gear 169 to cause pinion 153 to rotate in a clockwise direction. By virtue of the fact that gear 153 and sliding clutch 161 are now keyed together through the medium of teeth 156 and 165 and that sliding clutch 161 is further splined to rotate with shaft 146, it will be appreciated that rotation of gear 153 in the clockwise direction just described will be effective to cause rotation of shaft 146 in a clockwise direction, and torque will therefore be transmitted from shaft 9 to shaft 146 with a torque multiplication.

With shaft 146 rotating in a clockwise direction in the manner just described, transmission of torque to shaft 305 is effected in the following manner:

Pinion 301 formed in the rear end of shaft 146 tends to rotate in a clockwise direction and by virtue of its meshing engagement with planetary pinion 323, tends to cause counter-clockwise rotation of the latter. As pinion 323 is also connected to gear 306 formed on shaft 305, and rotation of shaft 305 is resisted by means of the load imposed thereon when planetary gear 323 tends to rotate in a counter-clockwise direction, it tends to planetate about gear 306 and carry its shaft 324 and cage member 309 therewith. Counter-clockwise rotation of cage member 309 and planetary shaft 324 thereby carried, however, is prevented by the overrunning clutch.

Any counter-clockwise rotation of planetary gear 323 about its shaft within the locked cage 309 is therefore effective to cause clockwise rotation of gear 306 and shaft 305 against the reaction of the load imposed thereon through the medium of gear teeth 331 and 333 formed on the pinions. Power is accordingly transmitted from shaft 146 to shaft 305 with a torque multiplication and the drive thus established between shafts 146 and 305 possesses a torque amplification depending upon the gear ratios utilized.

Normal selective automatic transition from torque multiplying drive to direct drive With the engine driving the vehicle through the transmission gears as previously explained, and regardless of whether the gear box clutch is disposed in high or low position for forward drive, if the vehicle is proceeding at a speed of above say approximately ten miles an hour, (depending upon the gear ratios used), the transmission may be automatically shifted into direct drive by releasing the accelerator, the operation taking place in the following manner:

When the accelerator is momentarily released, a reversal of drive occurs and gear 306, which has heretofore been driven by pinion 323, now exerts a driving tendency upon pinion 323 and tends to cause the latter to rotate in a clockwise direction together with the planetary pinion shaft 323 and the cage member 309. This force causes cage 209 to "free wheel" with respect to stationary collar 344 and cage member 309 is gradually accelerated in a clockwise direction until flywheel 372 attains an angular velocity which is sufficient to cause the weights of the secondary clutch mechanism to fulcrum outwardly and engage the secondary clutch.

When the plates of the secondary clutch are initially engaged, in response to release of the accelerator, the engine and shaft 146, which have lost some of their speed (as the result of closing the throttle), but which are still rotating faster than shaft 305, now drive the transmission parts, and as this results in imparting a further acceleration to the speed responsive part of the secondary clutch, weights 416 rock further outwardly and apply greater engaging forces to the secondary clutch plates. This is in effect a "servo" action and it would vigorously bring the engine and vehicle into synchronism with an objectionable shock if the secondary clutch were not specially designed to take care of this phase of operation.

The secondary clutch may be designed in several different ways to take care of the above described operating feature, but in the present instance I prefer to provide for a predetermined slip period in the secondary clutch, so that despite its "servo" action, it will nevertheless smoothly bring shafts 305 and 146 into synchronism. This is brought about by designing springs 405 to exert sufficient pressure and designing facings 391 and 592 to have sufficient friction area, so that when the clutch is fully engaged, with weights 416 disposed in their outermost positions in engagement with the flywheel rim, the clutch will have a torque capacity only slightly in excess of that required to maintain the transmission in direct drive when the engine is delivering its full torque output, with the gear box disposed in low gear.

It has been found that by designing the secondary clutch in this manner, it will smoothly slip and bring the transmission into direct drive without shock despite the "servo" action manifested thereby.

As described in connection with the primary clutch, the facings of the secondary clutch are preferably of a self lubricated character, for instance they may comprise colloidally associated copper particles and powdered graphite, or asbestos or other heat resisting materials may be mixed with powdered graphite and formed into facings. It is to be understood, however, that any suitable type of clutch facing may be used in the secondary clutch so long as it possesses the proper critical torque capacity to minimize the shock during the automatic shift from geared speed to direct drive. As the torque capacity of any friction clutch is proportional to the coefficient of friction, it is apparent that if a facing having a higher coefficient is used, either its working area or the spring pressure must be reduced, in order to bring its torque capacity to the proper value.

In the present embodiment of my invention I employ a facing having a dynamic coefficient of friction of approximately 0.3, and a static coefficient of approximately 0.5. This feature further contributes to reduce the vigor of the secondary clutch engaging operation, because the capacity of the clutch, when it is slipping, is considerably lower than when the clutch is completely engaged, by reason of its considerably lower dynamic (slipping) coefficient of friction. This characteristic of the clutch facing is fully taken advantage of in my transmission and it materially reduces the "bump" at the time of secondary clutch engagement.

Assuming that the engine is directly connected to the transmission, the capacity of the secondary clutch just sufficient to handle the engine torque may be computed by the equation:

$T_c$ is equal to $T(R_T-1)$ where $T_c$ represents the secondary clutch torque capacity; $T$ the torque impact to the transmission, and which in this instance is equal to engine torque, and $R_T$ represents the reduction ratio in the transmission. In the present transmission the reduction ratio is approximately 1.9 to 1, and therefore if $T$ is equal to 200 pound feet, $T_c$ is equal to 200 pound feet (1.9–1) is equal to 180 pound feet. The secondary clutch would, however, have a torque capacity slightly in excess of this figure, in order to enable the transmission to handle the load under full torque without slipping.

In other words, the secondary clutch must handle only the difference between direct engine torque (200) and the torque produced by the transmission (200×1.9 is equal to 380 pound feet).

If the gear box shown is used with the transmission and is shifted into low gear (ratio 1.33 to 1), the secondary clutch capacity will have to be greater, and this figure is obtained by the equation $T_{c1}$ is equal to $T_c \times R_{gb}$, where $T_c$ is the secondary clutch torque capacity value just discussed, $T_{c1}$ is the secondary clutch torque capacity which must be used when an auxiliary gear box is employed with the transmission, and $R_{gb}$ is the reduction ratio in the gear box. Using the values just given, $T_{c1}$ is equal to 180 pound feet × 1.33 is equal to 239 pound feet, or approximately 1.2 times engine torque (200 pound feet).

Although I prefer to design the secondary clutch in this manner, it is to be understood that the same results may be achieved by mounting a yielding coupling in the drive line, for instance in hub 387 of the clutch disc, having a capacity of the special secondary clutch just discussed, and the appended claims are intended to embrace my device when it is embodied in this form.

As the flywheel of the secondary clutch attains its maximum velocity, which will depend upon the vehicle speed at the time the shift is made, secondary clutch weights fulcrum outwardly to their maximum outer position and the driven disc of the secondary clutch is firmly gripped in non-slipping engagement between the automatic and floating plates of the secondary clutch. The "servo" action of the secondary clutch just described is effective to bring the relatively large momentums of the vehicle and the engine and transmission parts into synchronism and for this reason I have made the secondary clutch of a minimum capacity in order that the time duration of the synchronizing period is lengthened and the vigor or severity of the "shift" lessened to a considerable extent.

When the secondary clutch engages in the manner just described, a one-to-one drive is established between shafts 146 and 305, and the accelerator may accordingly be depressed to cause the engine to drive the vehicle with the transmission in high gear. Of course, if the driver defers depressing the accelerator and allows the vehicle to decelerate to a speed corresponding to the disengaging speed of the secondary clutch, the transmission will automatically drop back into gear with the result that when the accelerator is again depressed the transmission will be disposed in low gear.

It is accordingly observed that as it is not necessary to decelerate the engine or shaft 146 to speeds below the speed of shaft 305 in order to effect the shift operation, and that although the secondary clutch smoothly synchronizes the parts, the synchronizing period is comparatively short, the vehicle loses but little headway during the shift operation.

The minimum vehicle speed at which the shift may be effected depends upon whether the vehicle is on a level surface or is ascending or descending a grade. If the vehicle is ascending a grade, it must be accelerated to a high speed, say 15 to 30 miles per hour, (depending upon the steepness of the grade) in order for the transmission to remain in "high" gear after effecting the shift. On the other hand, if the vehicle is proceeding down grade, the load handled by the secondary clutch is of low magnitude and the shift may be made at speeds down to 10 miles per hour.

If the clutch of the forward gear box is located in its high position, the transmission shift just described will be effective to transmit torque from the prime mover to shafts 9, 146, 305 and the tail shaft of the vehicle without any amplification or reduction of torque.

With the vehicle operating with the transmission in high or direct drive, as just described, release of the accelerator will not be effective to cause disengagement of the secondary clutch unless the speed of the vehicle should drop below approximately ten miles per hour, with the result that the transmission normally remains in high irrespective of the direction of the drive above this speed. However, if the engine labors and is "pulled down", as for example in ascending a steep grade with the accelerator depressed, slippage will occur between the driven disc of the secondary clutch and the automatic plate, and the secondary clutch will become disengaged and cause the transmission to automatically promptly drop into low or torque multiplying drive.

Release or disengagement of the secondary clutch under such conditions is brought about by two factors. In the first place, the clutch is subjected to a high torque when the engine labors, with the result that it is only necessary for the secondary clutch to be decelerated to speeds slightly below its "fully engaging" speed before this torque will cause it to slip. As soon as the clutch starts to slip at all, a reverse "servo" action takes place and allows the carrier to come to rest and effect complete disengagement of the secondary clutch.

Accordingly, the transition from high to torque multiplying drive just described is almost instantaneous, by virtue of the fact that the secondary clutch disengagement takes place very rapidly because of its small capacity and the reverse "servo" action it manifests under these conditions.

Should the vehicle be proceeding at speeds below ten miles an hour, but closely proximate thereto, release of the accelerator will be effective to cause light engagement of the secondary clutch, with the result that if the throttle is opened to any considerable extent after effecting the shift, the secondary clutch will slip and the transmission will drop back into gear.

If, however, the vehicle should be proceeding at speeds appreciably below ten miles per hour, release of the accelerator will merely be effective to cause cage member 309 to overrun forwardly without attaining a speed sufficiently high to cause the secondary clutch to engage. Therefore, under the conditions just described, release of the accelerator is ineffective to effect the transmission shift, and the latter will pick up the vehicle in geared speed when the accelerator is again depressed.

Assuming now that the vehicle is proceeding with the gear box in low gear and the transmission in low, if it is desired to shift the sliding clutch 161 of the gear box into high gear, the operation may take place in the following manner: The accelerator pedal is released and the primary clutch pedal is depressed prior to manual shifting of clutch 161 in a manner similar to release of the accelerator pedal just prior to manual shifting of the transmission gears in the conventional motor vehicles now in use. During the interval between release of the accelerator pedal and shifting of clutch 161, the primary clutch is disengaged and carrier 309 of the transmission begins to overrun in the manner previously described, because shaft 305 drives the transmission parts under these conditions. The overrunning action of the carrier may or may not result in engaging the secondary clutch and shifting the transmission in the manner previously described, depending upon whether the vehicle is proceeding at a sufficiently high speed. It will thus be seen that the units which it is desired to synchronize consist on one hand of the driven disc of the primary clutch together with shaft 9 and on the other hand consist of shaft 146, together with gears 323 and the gear carrier and the load.

In view of the fact that the rotational inertia of the driven disc and shaft 9 are comparatively small, sliding clutch 161 may bring them into synchronism with shaft 146 without any objectionable clashing of gear teeth 164 and 143.

Locating the gear box between the primary clutch and the transmission is highly desirable because neither the mass of the transmission parts nor the mass of the secondary clutch need be synchronized with the vehicle, and the gear box may therefore be shifted with ease.

The shift of the gear box from high to low gear may be carried out in a manner similar to that just described.

Manual shift into reverse gear

If it is desired to cause the driven shaft to be driven in a direction reverse to the direction in which the driving shaft is rotated, the vehicle is brought to rest and sliding clutch 222 of the gear box is actuated by operating the dash control to bring reverse idler gear 224 into mesh with countershaft gear 173 and gear 181 keyed on to shaft 146.

Under such conditions rotation of shaft 9, in a clockwise direction as viewed from the left hand end of Figure 1, is effective to cause counter-clockwise rotation of gear 173, clockwise rotation of idler gear 224 and counter-clockwise rotation of shaft 146. In this manner shaft 146 is rotated in a direction reverse to rotation of shaft 9. Such rotation of shaft 146 and pinion 301 thereby carried tends to produce clockwise rotation of pinion 323 together with cage member 309, but carrier or cage member 309 is prevented from rotating under such conditions by means of detent lever 444 which automatically engages gear 442 as previously set forth in detail.

Accordingly, in reverse drive, with cage 309 locked against rotation, torque is transmitted in a counter-clockwise direction from pinion 323 to gear 306 formed on shaft 305 in the manner previously described in connection with the low gear or torque multiplying drive with the exception that shaft 305 is now driven in a reverse direction.

Although I have shown a positive locking device for carrier 309, it will be appreciated that cage 309 may be prevented from rotating in reverse drive by means of a friction brake or other suitable device provided with manual or automatic control and employed in lieu of gear 442 and the detent member disclosed in Figure 4 of my invention. Such friction brake or other means could of course be simultaneously actuated with operation of reverse shifter clutch 222 into reverse drive position, and the appended claims are intended to embrace my invention when it assumes this form.

Motor braking

Assuming that the vehicle is now proceeding with the transmission in direct drive, upon release of the accelerator pedal, torque will be transmitted from the driven shaft backward through the automatic transmission and gear box to the driving shaft and prime mover without any amplification of the torque transmitted. The motor will under such circumstances by virtue of its own inertia exert a braking influence upon movement of the vehicle and such braking operation will continue to be exerted until the speed of the vehicle drops below approximately ten miles per hour when, as previously described, the secondary clutch will automatically disengage and free the driven shaft of motor braking influences. However, most of the momentum of the vehicle has been dissipated by the time this occurs, and therefore this type of motor braking is wholly adequate for most driving conditions. Also, if desired, the gear box may be shifted into low gear to afford motor braking that is amplified in proportion to the ratios of the gears utilized therein.

If, however, the vehicle is proceeding under conditions of direct drive as just described, and it is desired to effect amplified motor braking by bringing the transmission into low gear, this may be effected by applying a braking influence to the carrier, so as to selectively cause disengagement of the secondary clutch and thereby establish a torque multiplying coupling between shafts 146 and 305. This result may be effected by providing a friction brake or other suitable means for cooperation with carrier 309 or the secondary clutch. When such brake is actuated, it will operate as a propeller shaft brake until the vehicle is decelerated to secondary clutch disengaging speed. When this speed is attained, the secondary clutch disengages and the carrier is promptly brought to rest so as to establish a torque multiplying coupling between the driving and driven shafts. In this manner the amplified braking effect of the motor may be obtained at any time at the will of the operator of the vehicle.

Engine cranking

Should it be desired to start the prime mover by coasting or towing the vehicle, it is necessary first that the primary clutch be engaged and secondly that the gear box be conditioned for forward drive. In order to effect engagement of the primary clutch, throwout shaft 95 may be rotated in a clockwise rotation for allowing engagement of the primary clutch in the manner hereinbefore set forth, by actuating knob 119 to cause latch member 105 to become disengaged from bracket 110 as described previously in connection with Figure 5. Under these conditions springs 35 will urge automatic plate 23 toward flywheel 4 to cause the driven disc 14 to be clamped therebetween.

The gear box may be conditioned for forward drive by shifting clutch 161 either to the left or right as seen in Figure 1 by means of the dash control to cause bringing the gear box into high or low gear. Under such conditions, when the vehicle is coasted or towed, torque will be transmitted through driven shaft 305 backward through planetary pinions 323, and when the vehicle is initially started, this merely results in carrier 309 overrunning, as gear 306 drives gear 333 which causes gear 331 to react against initially stationary gear 301 and effect forward rotation of the carrier. When the carrier attains secondary clutch engaging speed under the influence of the coasting or towing operation, the secondary clutch engages and establishes a direct drive between shaft 305 and shaft 146, with the result that power is transmitted through the gear box and the primary clutch and applied to the engine. After the engine has started, knob 119 may be pushed in and the clutch pedal depressed to restore the primary clutch parts to automatic position.

Modified form of secondary clutch mechanism

Figure 9:
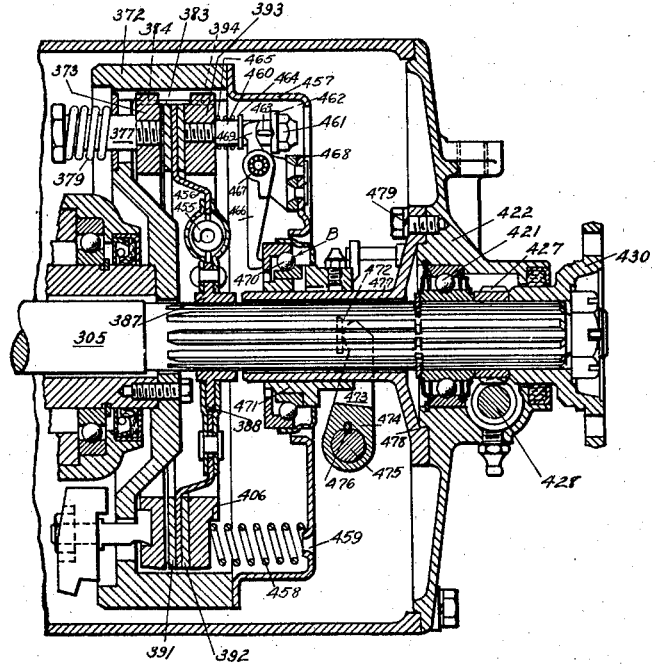
Figure 9 is a longitudinal sectional view of a modified form of secondary clutch which may be associated with the embodiment of my invention shown in Figure 1.

With reference now to Figure 9 of the drawings, a modification of the secondary clutch employed with the transmission shown in Figure 1 will be described. The modified secondary clutch of Figure 9 differs chiefly from the secondary clutch of Figure 1 in that the structure of Figure 9 is adapted to allow manual engagement and disengagement of the secondary clutch mechanism. As many of the parts in the structure of Figure 9 are similar to parts in the secondary clutch of Figure 1, identical reference characters have been used to designate like parts in both views and only those parts in Figure 9 which are new or radically changed have been given new reference characters.

The secondary clutch of Figure 9 comprises a flywheel 372 provided with internal splines 383 adapted to cooperate with external splines 384 and 394 formed on automatic and floating plates 373 and 393 respectively, as previously described.

Adapted to urge the automatic plate toward the flywheel web is a plurality of bolts 377 each encircled by a compression spring 379 which functions in the manner previously disclosed with respect to Figure 1. Mounted on shaft 305 is a hub 387 having a flange 388 to which is secured a resilient coupling which takes the form that is commonly known in the automotive industry as a clutch plate vibration dampener indicated at 455 which provides a resilient connection between shaft 305 and a driven disc member 456 thereby carried. The outer portion of disc 456 is disposed parallel to and is located between the automatic plate 373 and floating plate 393. Driven disc 456 is provided with facings 391 and 392 similar to those disclosed in connection with Figure 1.

Secured to the rear face of the flywheel is a modified cover structure 457. Disposed between the cover and the floating plate are a plurality of springs 458, each of which at one end bears against cover 457, the other end bearing against the bottom of one of a plurality of recesses 406 formed in the floating plate. Springs 458 are centered with respect to the flywheel cover by means of pressed in portions 459 formed therein.

Threaded into self-locking engagement with the floating plate is a plurality of bolts 460, each of which at its outer end is adapted to receive a castle nut 461 which bears against a washer 462 in turn abutting knife edges 463. A washer 464 is concentrically disposed with respect to bolt 460 and is spaced from the floating plate by means of light compression springs 465.

A throwout lever 466 mounted for rotation upon a stud 467 carried by bracket 468 mounted on the pressed in portion of cover 457 is provided at its upper end with bifurcated portions 469 which lie, one on each side of bolts 460, between knife edges 463 and washer 464.

The throwout structure just described is similar to the throwout mechanism described in connection with the primary clutch of Figure 1, and operates in a similar manner, rotation of throwout lever 466 being effective to cause reciprocation of bolts 460 and movement of floating plate 393 toward or away from the flywheel.

Rotation of throwout lever 466 in the manner just described is effected by means of a throwout bearing assembly indicated generally as B, and which is in all respects similar to the throwout bearing assembly described in connection with the primary clutch of Figure 1, and which is therefore not described in detail.

The throwout bearing assembly comprises briefly a bearing 470 adapted to be supported upon a sleeve 471 which is provided with ears or lugs 472 against which bear the bifurcated portions 473 of a throwout lever 474 mounted upon a shaft 475 and keyed thereto as indicated at 476. Rotation of throwout shaft 475 is effective by means of a throwout lever 474, thrust bearing assembly B and fingers 466 to cause displacement of the floating plate toward or away from the flywheel in the manner previously described. Thrust bearing assembly B is mounted upon a sleeve 477 flanged outwardly as shown at 478 and fastened to cover member 422 in any suitable manner as for example by cap screws 479. Bearing 421, worm gear 427, speedometer pinion 428 and sleeve 430 are in all respects identical with the similar structure described in connection with Figure 1.

Figure 10:
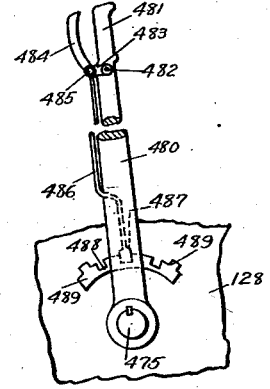
Figure 10 is a view in elevation of the manual control employed with the secondary clutch shown in Figure 9.

With reference now to Figure 10 of the drawings, keyed to shaft 475 externally of housing 128 is a lever 480 provided at its upper end with a handle 481 to which is pivoted, by means of a pin 482, a bracket 483 on the outer end of which is rigidly mounted a handle 484. Associated with handle 481 and bracket 483 by means of a pin 485 is a detent rod 486 adapted to be elevated or lowered by rocking the handle and bracket about pin 482. The lower end of detent rod 486 is provided with a detent 487 adapted to be accommodated in recesses 488 provided in a bracket 489 secured to housing 128 in any suitable manner.

Rotation of shaft 475 is effected by drawing detent lever 484 toward handle 481 which withdraws detent 487 from the particular recess 488 in which it happens to be disposed, and lever 480 may then be rotated to cause rotation of shaft 475. Lever 480 is adapted to be selectively positioned in any one of three different positions corresponding to "automatic", "engaged" or "disengaged" secondary clutch positions by virtue of the fact that detent 487 therewith associated may be accommodated in any one of three different recesses 488 formed in bracket 489. Left hand recess 488 is adapted to retain hand lever 480 in position to cause manual disengagement of the secondary clutch, while disposition of detent 487 in the right hand recess 488 is effective to position lever 480 so as to cause manual engagement of the secondary clutch. With the parts disposed in the positions indicated in Figures 9 and 10, with detent 487 located in the center recess 488, the hand lever 480 is disposed in automatic position, with the result that shaft 475 as seen in both Figures 9 and 10 is so disposed as to cause throwout bearing B and fingers 466 to be held in automatic position.

Movement of hand lever 480 to the left, as seen in Figure 10 is effective to cause counterclockwise rotation of shaft 475, and reciprocation of throwout bearing B to the left as seen in Figure 9, which cause manual disengagement of the secondary clutch. Actuation of hand lever 480 to the right, under the influence of springs 458, is effective to cause clockwise rotation of shaft 475 and, as seen in Figure 9, by means of throwout bearing B and fingers 466 allows manual engagement of the secondary clutch to be effected in the manner previously described with the primary clutch.

It will thus be seen that if the transmission disclosed in Figure 1 of the drawings is provided with a secondary clutch of the type illustrated in Figures 9 and 10 of the drawings, it will accordingly be possible to manually engage or disengage either the primary or the secondary clutches.

The various operations of this form of the invention, when throwout shaft 475 is disposed in its automatic position seen in Figure 1, are precisely the same as those described in connection with the first form of my invention, and they will therefore not be repeated.

With the transmission operating in high or direct drive, handle 480 may be rocked into its left-hand position (Figure 10) to disengage the secondary clutch and smoothly bring the transmission into low gear, for instance in ascending steep grades or other instances where it is desired to maintain the transmission in low gear. If the transmission is operating in low gear, lever 480 may be operated in this manner to prevent the transmission from automatically shifting into high gear in response to release of the accelerator and allow the transmission to "free wheel".

On the other hand, if it is desired to maintain the transmission in high gear, irrespective of the manner in which the accelerator is actuated, handle 480 may be brought into its right-hand position so as to thereby maintain the secondary clutch engaged at all speeds of flywheel 372. This operation may be performed during any phase of transmission operation to smoothly bring the parts into synchronism, as it merely involves a frictional pick up of the secondary clutch elements.

The carrier may be equipped with a friction brake for affording amplified motor braking, as described in connection with the first modification of my invention, and in this instance, it would preferably be inter-connected with the throwout shaft, so that clutch disengagement would be effective to substantially simultaneously apply the brake and bring the carrier to rest. If desired, the carrier ratchet lock may also be dispensed with and the brake also connected to the reverse shifter rod, so that it would also be applied when the gear box is shifted into reverse, for preventing the carrier from rotating forwardly under those conditions. Such construction would embody lost motion or one-way connections, so that actuation of one element would not be interfered with by the other elements.

In connection with this form of the invention I desire to particularly point out the novel and important function of the resilient coupling 455 utilized with this device. With lever 480 disposed in automatic position, release of the accelerator, when the vehicle is proceeding at speeds in excess of 10 miles per hour in low gear, effects the shift into direct drive, as previously set forth. In this form of the invention, however, the resilient coupling further greatly assists in minimizing the shock during the synchronizing period, as it yields when the impulse is applied thereto, and the energy stored up in the springs thereof is returned to the drive when the synchronizing operation has been completed. As a matter of fact the capacity of the secondary clutch may be materially increased over that of the first form of my invention without producing unsatisfactory operation, because the resilient coupling yields and smooths out the power "surge" that tends to manifest itself during the synchronizing period of the secondary clutch. I prefer, however, to employ both a special low capacity secondary and a resilient coupling in this form of the invention.

*Modified form of power transmitting mechanism*

With particular reference to Figure 11 of the drawings, an alternate form of my invention is disclosed. This form of invention includes a primary clutch; a torque multiplying transmission having a secondary clutch; and a gear box, each of which units in certain respects is similar to the corresponding unit disclosed in the first form of my invention. In the alternate form of my invention, however, the gear box is located to the rear of the torque multiplying transmission, whereas in the form of my invention disclosed in Figure 1 of the drawings the gear box is located between the primary clutch and the torque multiplying transmission.

Due to the similarity of many of the parts disclosed in the alternate and preferred forms of my invention, I have in Figure 11 indicated parts which are similar to parts shown in Figure 1 by the same reference characters employed in Figure 1, with the addition of the subscript *a*.

New reference characters have been accorded, however, to parts of the structure shown in Figure 11 which are different in structure or function from the structure of Figure 1.

With continued reference to Figure 11 of the drawings, driving shaft 3a is secured to flywheel 4a by bolts 5a or any other suitable means. The primary clutch comprises a hub 11a, vibration dampener 13a, driven disc 14a, an automatic plate 23a, reaction plate 24a and centrifugal weight levers 41a, all of which parts are similar to those described in connection with Figure 1.

It will be observed, however, that nuts 58a cooperate with fingers 500 secured to cover 19a, which holds the primary clutch parts in automatic position when the engine is idling or stopped, with the result that no manual throwout is associated with the primary clutch of Figure 11, and the clutch is therefore fully automatic.

Cover member 19a is turned inwardly toward driven shaft 9a and at its inner extremity is secured by means of a rivet 491 or the like to a one-way or overrunning clutch now to be described.

Rivets 491 secure an overrunning clutch race 492 to cover 19a. Member 492 is provided with a cylindrical inner face to which a plurality of clutch rollers 493 wedgingly cooperate. Rollers 493 also cooperate with a clutch member 494 which is splined upon shaft 9a and which provides a plurality of cam faces 495. Rollers 493 are adapted to be urged into wedging engagement with the clutch members by a plurality of spring fingers 496 which are struck out of a plate 497. Plate 497 is disposed between clutch members 492 and 494 and a plate 498 which is also secured to cover 19a. Although, if desired, plate 497 may be splined to shaft 9a, so as to cause fingers 496 to urge rollers 493 into cooperative relationship with the clutch members under a pretermined constant pressure, I preferably allow plate 497 to float and employ a spring, which takes the form of a spring ring or washer 499, to urge plate 497 into contact with the clutch members so that, as the result of the frictional forces set up, and which tend to rock plate 497, fingers 496 will be actuated so as to only exert substantial engaging forces upon rollers 493 when shaft 9a is tending to overrun with respect to shaft 3a. When the primary clutch is disengaged and shaft 3a tends to overrun shaft 9a, plate 497 tends to rotate clockwise (Figure 11a) and relieve rollers 493 of pressure. Rollers 493 are accordingly subjected to a minimum of wear. Member 494 and rollers 493 are restrained against forward axial movement by means of a flanged plate 499', which is spun into a groove in member 492.

By the structure just described, the one-way clutch is inoperative to transmit power from shaft 3a to shaft 9a, but it is automatically operable to transmit power from shaft 9a to shaft 3a, and the function of this clutch will be pointed out hereinafter.

The primary clutch automatically operates in a manner precisely similar to that of the primary clutch disclosed in Figure 1 of the drawings, and therefore, as driving shaft 3a is accelerated, the centrifugal weights of this clutch are caused to fulcrum outwardly about their respective knife edges and cause the driven disc 14a to be clamped between the automatic plate and the flywheel, thereby transmitting torque to shaft 9a.

It will be seen that since no manual throwout control is associated with the primary clutch, the latter may not be manually disengaged during warming up the prime mover, nor may the primary clutch be manually engaged to effect engine cranking by coasting or towing the vehicle. It is unnecessary to disengage the clutch, however, during warming up of the prime mover since under such conditions the gear box sliding clutch may be disposed in neutral position in the manner hereinafter set forth and torque under such circumstances will not be transmitted to the driving shaft. It is also unnecessary to manually engage the primary clutch while cranking the engine by coasting or towing the vehicle, since under these conditions the one-way clutch between the primary clutch cover and shaft 9 will automatically lock and establish a driving connection between shafts 9a and 3a by way of the clutch cover.

The rear end of shaft 9a is provided with a pinion gear 501, and a bore 144a adapted to receive the reduced end of a shaft 305a which is journalled therein by means of bushing 502 or the like.

Pinion 501 is adapted to cooperate with the planetary pinion 323a which is mounted for free rotation by means of bearings 325a upon planetary pinion shafts 324a which is supported within cage member 309a.

Cage member 309a is in this instance provided with an integral sleeve 343a, which extends forwardly therefrom and shaft 9a is mounted for free rotation therein by means of bushings 503 or the like. Sleeve 343a in this form of invention is journalled in two ball bearing assemblies 504 which are retained within a collar member 344a and the outboard carrier bearing used in the first form of the invention is omitted. Collar 344a is also provided with the overrunning clutch cam faces and it is secured by means of screws 505 or the like to a partition 348a extending inwardly from the transmission housing 128a and secured thereto in any suitable manner as for example by means of cap screws 351a or the like. Leakage of oil from the region of bushings 503 outward along sleeve 343a toward the clutches is prevented by means of oil grooves 507 formed in the end of sleeve 343a. Oil from the region of bushings 503 is conducted by means of an oil port 506 to bore 144a in shaft 9a for the purpose of lubricating bushing 502.

Pinions 333a mesh with a gear 512 splined upon shaft 305a and restrained against axial movement by means of a split ring 514.

The planetary pinions and their supporting carrier structure just described forms the "transmission" of this form of my invention and is similar in structure and function to the torque multiplying mechanism of the preferred form of my invention previously described except for differences that will be pointed out hereinafter.

Secured to the forward end of carrier sleeve 343a, and mounted for rotation therewith, by means of bolts 370a or the like, is the web portion 371a of a flywheel-like member 372a, provided with internal spline 383a. Disposed within flywheel 372a and mounted for rotation therewith by means of splines cooperating with splines 383a of the flywheel is an automatic plate 373a and a floating plate 393a parallel to and between which is disposed a clutch disc 390a mounted upon shaft 9a by means of a hub 387a. Secured to flywheel 372a in any suitable manner is a cover member 369a, provided with a plurality of pressed out portions 401a each of which is adapted to accommodate one end of a series of compression springs 405a, the other ends of which react against floating plate 393a and thus urge the floating plate away from the cover and toward the automatic plate at all times.

Springs 405a are centered with respect to the cover member and the floating plate by means of bosses formed on both the cover plate and the floating plate.

Threaded into self-locking engagement in automatic plate 373a is a plurality of holdback bolts 377a which extend through apertures 375a formed in the web of the flywheel and each of which is provided with a head 378a. Encircling each bolt 377a and at one end bearing against the head thereof is a compression spring 379a, the other end of which bears against a plate disc 376a positioned on the web of the flywheel and covering aperture 375a. It will be seen that the holdback bolts 377a function in a manner similar to bolts 377 described in connection with the secondary clutch of Figure 1 as they urge the automatic plate at all times toward the web of the flywheel.

Threaded into self-locking engagement with floating plate 393a and extending outwardly through apertures in cover member 396a are a plurality of bolts 399a each of which is provided with a head 402a which is adapted to bear against cover member 396a. These bolts function in a manner similar to bolts 399 described in connection with Figure 1 of the drawings to prevent the floating plate from being urged by compression springs 405a more than a predetermined distance toward the reaction plate. The mechanism just described comprises the secondary clutch unit of the alternate form of my invention and functions in a manner similar to the secondary clutch unit of the preferred form of my invention hereinbefore described, with the exception that it is operable to connect the carrier to the driving shaft (9a) instead of the driven shaft.

From the description of the primary clutch, the transmission unit and the secondary clutch, thus far related, it will be appreciated that acceleration of driving shaft 3a is effective to cause engagement of the primary clutch and transmission of power to shaft 9a. Such transmission of power to shaft 9a causes rotation of pinion gear 501 formed on the rear end thereof in a clockwise direction when viewed from the left hand end of Figure 11, and by virtue of its meshing engagement with planetary pinions 323a, tends to rotate the latter in a counter-clockwise direction. As teeth 333a of the planetary pinions are adapted to transmit torque to the driven shaft 305a by gear 512, and since rotation of the latter shaft is resisted by means of the load imposed thereon, pinions 323a tend to planetate about shaft 305a and cause pinion shafts 324a and carrier 309a to rotate in a counter-clockwise direction. This tendency, however, is prevented by overrunning clutch rollers 347a which are urged into wedging engagement with their cam surfaces on collar 344a under these conditions.

Under the conditions just described, the carrier is locked and the planetary pinions are therefore caused to rotate in a counter-clockwise direction about their stationary shafts and drive gear 512a and shaft 305a in a clockwise direction. Power is therefore transmitted to shaft 305a in the same general manner and with a similar value of torque multiplication as in the mechanisms previously described. Acceleration of driving shaft 9a is therefore automatically effective to cause transmission of amplified torque to driven shaft 305a.

The transition from torque multiplying drive to direct drive may be selectively effected in a manner similar to that described in connection with the preferred form of my invention by momentarily releasing the accelerator pedal. Such release of the accelerator pedal is effective to cause torque to be transmitted from gear 512 to pinions 323a, with the result that the pinion carrier is picked up and rotated in a clockwise direction, and flywheel 372a is given a like acceleration. Acceleration of flywheel 372a in this manner causes the secondary clutch weights to fulcrum outwardly and engage the secondary clutch, with the result that disc 390a is frictionally gripped between the automatic and floating plates of the secondary clutch, and the disc and flywheel are rapidly brought into synchronism and rotate as a unit about a common axis, together with shaft 9a, to which the disc 390a is splined. As carrier 309a and shaft 9a are now rotating as a unit about a common axis, no rotation of pinions 323a about their own axes takes place, and teeth 333a thereof act in effect as keys to transmit torque to driven shaft 305a.

In this form of my invention it is observed that when the accelerator is momentarily released to effect the shift, disc 390a, at the instant of accelerator release, is rotating at a speed which is greater, and whose speed ratio with respect to shaft 305a is inversely proportional to the torque multiplication provided by the transmission. For instance, if the speed ratio between shafts 9a and 305a is 1.66 to 1, and the shaft 9a is rotating at 600 R. P. M. when the shift is made, shaft 305a at this time will be rotating at approximately 360 R. P. M. The momentum of the vehicle keeps shaft 305a rotating substantially at this speed while the shift is being effected, and although shaft 9a, by reason of the engine throttle being closed, decelerates to some extent, it is still rotating considerably in excess of 300 R. P. M. It is therefore apparent that when the secondary clutch engages, disc 390a, which is connected to shaft 9a, imparts a further acceleration to carrier 309a, which immediately results in rocking the centrifugal weights further outwardly to further increase the clutch pressure.

The operation just described results in a "servo" action, and it is preferably taken care of by designing the secondary clutch so as to have a minimum torque capacity, as described in connection with the device shown in Figure 1. In this instance, however, the clutch would only have a torque capacity that is slightly in excess of the direct torque output of the engine, because, as the gear box is located behind the transmission, torque is transmitted from the latter to shaft 9a in a one-to-one ratio at all times. If desired, however, the resilient coupling shown in Figure 9 may be used alone or in combination with the special capacity secondary clutch, in order to lengthen the synchronizing period and insure a smooth delivery of power.

In this form of the invention spur gears are used throughout and therefore no axial thrusts are set up. However, if desired, helical gearing may be used and the appended claims are intended to embrace my device irrespective of the type of gearing used therein.

The gear box construction will now be described. The rear end of shaft 305a extends through wall 134a of housing 128a and is journalled therein in a bearing 135a and is provided with a pinion 521 and internal teeth 522. Shaft 305a is further provided with a bore 523 in which is journalled, by means of needle bearings 524 or the like, the reduced forward end of a shaft 146a. The outer race of bearing 135a is retained in position by means of a split ring 526 and a disc member 527 which is bolted to partition 134a in any suitable manner, as for example by means of bolts or the like and which extends inwardly into overlapping relation with the outer race of bearing 135a. The inner race of bearing 135a is maintained in position by means of a split ring 529 received in a groove formed in shaft 305a.

Splined to shaft 146a is a sliding clutch 531 provided with forward teeth 532 and rear teeth 533. Teeth 532 of the sliding clutch are adapted to mesh with internal teeth 522 formed in the rear end of shaft 305a and rear teeth 533 of the sliding clutch are adapted to mesh with internal teeth 534 formed on a gear 535 mounted for free rotation upon shaft 146a. Gear 535 is maintained in position on shaft 146a by means of a washer 536 and a snap ring 537.

Sliding clutch 531 is adapted to reciprocate within a sleeve member 540 which, disposed concentrically with shaft 146a, is supported at its forward end upon pinion 521 and at its rear end is supported upon gear 535. Sleeve 540 is provided at its rear end with a flange member 541 which is keyed for rotation with sleeve 540 by means of pins 542 or the like, and at its forward end is provided with an integral flange 543. Flange member 541 is adapted for slipping frictional engagement with a disc 544 which is mounted for rotation with gear 535 by means of a spline connection. Flange 543 of sleeve 540 is adapted for slipping frictional engagement with a disc 545 mounted for rotation with gear 521 formed on the rear end of shaft 305a.

Figure 13:
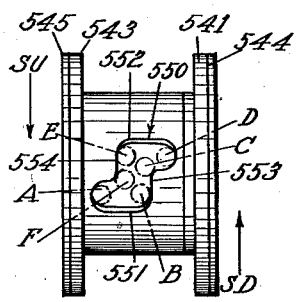
Figure 13 is a bottom elevational view of the gear box clutch sleeve disclosed in Figure 11.

Adapted for longitudinal reciprocation upon the external surface of sleeve member 540 is a collar member 547, provided with a groove 548 adapted to receive a shifter fork in a manner to be presently set forth. Sliding clutch 531 and shifter collar 547 are adapted for synchronous axial movement by means of a pin 549 extending through an S-shaped slot 550 formed in sleeve 540. Slot 550 is provided with bottom and top portions 551 and 552 respectively and with side walls 553 and 554. Pin 549 is adapted to be disposed relative to slot 549 in any one of the six positions indicated at A, B, C, D, E, and F of Figure 13 in a manner to be presently described. Pin 549 also functions to secure collar 547 and sleeve 531 together for synchronous rotation.

Disposed parallel to shaft 146a and mounted within partition forming walls 134a and 186a of the transmission housing 128a is a counter-shaft 176a which is prevented from rotating therein by means of a flat face 193a adapted to cooperate with a housing section to be hereinafter described.

Journalled for rotation upon counter-shaft 176a, by means of bushings 174a and 175a, is a cluster gear member 169a. Formed on cluster gear member 169a is a gear 168a adapted to be permanently meshed with gear 521 formed on the rear end of shaft 305, a gear 171a adapted to be selectively meshed with gear 535 freely mounted upon shaft 146a and a gear 173a. Gear 173a is adapted to be brought into torque driving relation with a gear 182a mounted for rotation with shaft 146a by means of an idler gear 224a in a manner to be hereinafter described. Gear 182a is keyed to shaft 146a in any suitable manner.

Shaft 146a is at its rear end supported in a bearing 185a disposed within partition forming walls 186a extending inwardly from transmission housing 128a. The outer race of bearing 185a is maintained in position by means of a snap ring 555, and by means of an auxiliary housing 556 secured to the rear of the main transmission housing 128a in any suitable manner. A portion of auxiliary housing 556 is disposed adjacent flat face 193a formed in countershaft 176a to prevent rotation of the latter. Mounted on the rear end of shaft 146a and spaced from ball bearing assembly 185a by means of a spacer disc 557, is a worm gear 558 adapted to cooperate with a speedometer drive pinion 559. Also splined on the rear end of shaft 151a is a sleeve member 430a having a flange 431a adapted to be associated in any suitable manner with a universal joint. Members 185a, 557, 558 and sleeve 430a are maintained in position upon shaft 146a by means of a nut 432a. Leakage of oil axially out of the gear box between sleeve 430a and housing 556 is prevented by means of oil returning grooves 561 formed on the inner face of housing 556. Above housing 556 is located a brake shoe 562 adapted for cooperation with a brake drum 563 secured in any suitable manner to the front face of flange 431a of sleeve 430a.

From the gear box structure just described, it will be apparent that torque may be transmitted directly in a one-to-one ratio from shaft 305a to shaft 146a by so positioning sliding clutch 531 that teeth 532 thereof will mesh with internal teeth 522 formed on the rear end of shaft 305a, as shown in Figure 11 of the drawings. Under such conditions, counter-shaft gear 168a will be rotating due to engagement of teeth 168a thereof with gear 521 and through gear 171a of the countershaft gear, gear 535 freely mounted upon shaft 146a will also be simultaneously rotated freely about shaft 146a but without transmission of any torque thereto. Transmission of amplified torque from shaft 305a to shaft 146a may be effected by shifting sliding clutch 531 to the right, as seen in Figure 11, until teeth 533 thereof are meshed with internal teeth 534 on gear 535. Under such conditions torque will be transmitted from shaft 305 to gear 521, countershaft gears 168a and 171a, through gear 535 and thence by way of teeth 534 and 533, to shaft 146a. As the diameter of gear 521 is less than the diameter of gear 168a and further as the diameter of gear 171a is less than the diameter of gear 535, it will be appreciated that torque transmitted to shaft 146a in the manner just described will undergo a double multiplication. The operation of the gear box just described is similar to the operation of the gear box previously described in connection with Figure 1 of the drawings, except for the synchronizer or lock, whose functions will be dealt with in detail hereinafter.

Reverse drive may be established between shafts 305a and 146a by reciprocating sliding clutch 531 into its neutral position, and causing reverse idler gear 224a, which is rotatably and axially slidable on shaft 221a, to be brought into mesh with countershaft gear teeth 173a and the teeth 182a of gear 181a which is keyed to shaft 146a. Torque will then be transmitted from shaft 305a to pinion 521, countershaft gear 168a and 173a to idler gear 224a and thence to gear 181a and shaft 146a. Under such conditions shaft 146a will be rotated in a direction reverse to the rotation of shaft 305a in a manner similar to that described in connection with reverse drive of Figure 1 of the drawings.

When it is desired to shift sliding clutch 531 into either high or low position, the teeth of the sliding clutch are brought into synchronous meshing engagement with either teeth 522 or teeth 534 by an operation which is entirely automatic in character by virtue of the structure previously described in connection with the sliding clutch.

Assuming that the sliding clutch is disposed in its "high" gear position, as illustrated in Figure 11 of the drawings, and it is desired to shift the clutch longitudinally to the right until it is disposed in its "low" position, collar 547 is manually actuated to the right as seen in Figure 11 and pin 549 which at the beginning of the operation is disposed in position A in the lower portion 551 of the S-shaped slot 550 (Figure 13) is moved to the right into position B into contact with wall 553 thereof. As pin 549 is pressed into contact with wall 553 of the slot, pin 549 urges cylindrical collar 540 and flange 541 to the right and flange 541 is firmly pressed against disc member 544, with the result that the frictional coupling thus established tends to make the two discs rotate synchronously. Engagement of pin 549 with wall 553 of slot 550 stops clutch 531 short of engagement with low gear teeth 534.

Since gear 535, prior to the shift operation just described has been rotating at a lower speed than has shaft 146a, because of the speed reducing gearing, it will be appreciated that disc 544 will exert a dragging action upon flange 541 and cylindrical collar 540 and tend to cause the latter to be relatively rotated in a counter-clockwise direction with respect to shaft 146a when viewed from the left of Figure 11. This force has been indicated in Figure 13 by the arrow S. D. (shift down). Under these conditions pin 549 will be maintained in the lower end 551 of S-shaped slot 550 and will not be allowed to move to its extreme right hand position, such movement to its extreme right hand position being permissible only when the pin is relatively disposed in the upper portion 552 of the slot 550. When the vehicle accelerator is now depressed, the speed of gear 535 will be increased, and because of the frictional engagement between disc 544 and 541, collar 540 will be gradually accelerated until it is rotating at a speed equal to or slightly greater than the rotational speed of shaft 151a. At this time collar 540 will promptly reverse its rotative tendency and will tend to rotate in a clockwise direction with respect to shaft 151a. Immediately upon manifestation of this tendency, sleeve 540 will rock relative to pin 549 until the latter is disposed in upper portion 552 of the S-shaped slot 550 (position C). This will permit clutch 531 to be meshed with low gear teeth 534, and as a force tending to actuate collar 547 toward the right, as viewed in Figure 11, has been applied to the parts throughout the shifting operation, the final step will take place automatically. Under these conditions, pin 549 will be disposed in its extreme right hand position D, and teeth 533 of the shifter clutch will be disposed in mesh with internal teeth 534 on gear 535. It is therefore observed that the shifting operation may be effected without exercising any particular care and without producing clashing, as pin 549 moves to the right only when the clutch and gear are rotating at equal angular speeds.

If desired a resilient connection may be provided between the shifter control and the manual shift handle, so that the latter may be promptly shifted into its fully shifted position, and the resilient connection be employed to shift clutch 531 upon synchronization of the driving and driven parts.

Conversely, if it is desired to shift from low gear into high gear, it is necessary only to actuate the control mechanism which tends to shift sliding clutch 531 to the left as seen in Figure 11 at which time pin 549 will be moved from its extreme right hand position D in the upper portion of slot 550 to the left into position E against wall 544 of the slot. By virtue of the fact that gear 521 and plate 545 associated therewith under such conditions are rotating at a speed which is in excess of the speed of rotation of shaft 146a and collar 540 when pin 549 bears against wall 554 and frictionally causes flange 543 and plate 545 to move together, cylindrical collar 540 will tend to move in a clockwise direction with respect to shaft 146a. This force is represented by the arrow S. U. (shift up) in Figure 13. This operation results in retaining pin 549 in the upper portion 552 of the S-shaped slot 550 until, by release of the accelerator pedal, the speed of the engine is so decelerated as to cause pinion 521 and plate 545 associated therewith to rotate at an angular speed which is only slightly less than the speed of rotation of shaft 146a, at which time collar 540 will tend to rotate in a counter-clockwise direction with respect to shaft 146a and the slot 550 will in consequence move relative to pin 549 until the latter is disposed in position F in the bottom portion 551 of slot 550 at which time the jaw clutch will move into its extreme left hand position A under the constant force applied by the control mechanism to shifter clutch collar 547.

In this manner clutch teeth 532 are brought into synchronism with teeth 522 formed on shaft 305 silently and entirely automatically, since teeth 532 and 522 are not meshed until their rotational speeds are equal. It will thus be appreciated that the structure of the sliding clutch 531 has the advantage of allowing the operator to shift the clutch at any time desired regardless of the relative speeds of the prime mover and vehicle and to cause automatic synchronism of the vehicle and engine without any objectionable surge or jar and in an entirely automatic and fool-proof manner.

Figure 12:
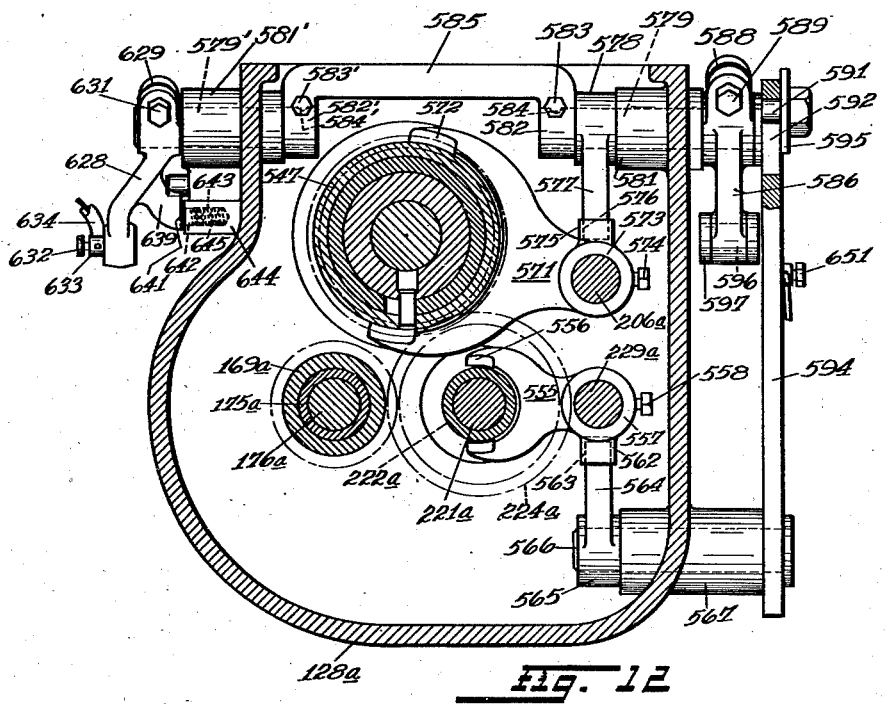
Figure 12 is a sectional view taken substantially on line 12—12 of Figure 11, and illustrates the actuating assembly for controlling the gear box thereof.
Figure 14:
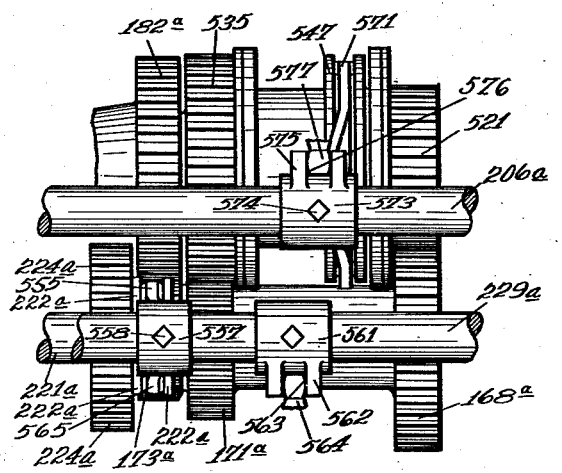
Figure 14 is a fragmental elevational view as seen when looking in from the right of Figure 12, parts thereof being omitted for clarity of illustration.

The control mechanism for the reverse gear and the sliding clutch 531 may take any desired suitable form, but in the present instance I employ a power operated device which will now be described in connection with the reverse gear. With attention directed particularly to Figures 12, 13, and 16 of the drawings, a stud shaft 221a is disposed parallel to and in the same horizontal plane with counter-shaft 176a and mounted for free rotation thereon is a reverse idler gear 224a. Stud shaft 221a is similar to shaft 221 of the preferred form of my invention, and is supported in a similar manner within housing 128a. Integrally formed on reverse gear 224a is a collar member 222a which is adapted to be actuated by means of a shifter fork 555 provided with fingers 556 and which is rigidly mounted by means of a collar 557 upon shaft 229a in any suitable manner as for example by means of a set screw 558 or the like.

Shaft 229a corresponds to shaft 229 previously described in connection with the preferred form of my invention and is supported in housing 128a in a similar manner. Also mounted upon shaft 229a forwardly of collar 557 is a second collar member 561 having a pair of lugs 562 depending therefrom and adapted to accommodate therebetween the curved faces 563 of a lever 564 mounted by means of a collar 565, upon a stud shaft 566 journalled in a bearing 567 formed integrally with housing 128a. Lever 564 is mounted for rotation with shaft 566 in any suitable manner, and shaft 566 extends outwardly from housing 128a for a purpose to be presently set forth.

Rotation of shaft 566 is effective to cause rotation of lever 564 and reciprocation of collar 561 together with shaft 229a, which in turn effects similar reciprocation of collar 557 and throwout fork 555. In this manner, rotation of shaft 566 is operable to reciprocate idler reverse gear 224a either into or out of meshing engagement with gear 173 and gear 181.

Sliding clutch 531 splined on shaft 146a is adapted by means of its collar member 547 to be actuated by a throwout lever 571 provided with fingers 572 and mounted by means of a collar 573 and a set screw 574 upon and for reciprocation with a shaft 206a. Shaft 206a is similar to shaft 206 described in connection with Figure 1 of the drawings and is mounted in a similar manner within transmission casing 128a.

Collar 573 is provided with two lug members 575 extending upwardly therefrom and adapted to receive therebetween the curved faces 576 of a lever 577, which has a hub 578 mounted upon a shaft 579 journalled within a bearing 581 integrally formed with transmission housing 128a. Shaft 579 extends outwardly from the transmission housing for a purpose presently to be set forth.

Mounted upon shaft 579 adjacent hub 578 is a split hub 582 which is secured thereto by means of a bolt 583 extending therethrough and cooperating with a groove 584 formed on shaft 579. Hub 582 is integrally formed with yoke 585, upon the other end of which is formed a second split hub 582' similar to hub 582 just described, and which is secured by means of a bolt 583' cooperating with a groove 584' formed on the end of a shaft 579' to rotate therewith. Shaft 579' is journalled within a bearing 581' formed as an integral part of transmission housing 128a and extends outwardly from the transmission housing for a purpose to be hereinafter set forth.

It will be appreciated that rotation of either shaft 579 or shaft 579' is effective to cause rotation of lever 577 and reciprocation of shaft 206a, together with throwout fork 571 and sliding clutch 531. Accordingly, by selective rotation of either shaft 579 or shaft 579', sliding clutch 531 may be disposed in its neutral position or either of its positive torque transmitting positions.

To the outwardly extending end of shaft 579 is affixed a bell crank having arms 586 and 587, the bell crank having a split hub 588 which is rigidly clamped to shaft 579 by means of a bolt 589. Secured in the end of bell crank arm 587 is a bolt 591 which extends away from housing 128a through an aperture 592 formed in a T-shaped member 594 which will presently be described. Aperture 592 comprises a narrow portion of arcuate shape and an enlarged portion 593, as clearly seen in Figure 15.

A washer 595 is positioned concentrically on bolt 591 between the head of said bolt and the outer face of the T-shaped member 594. This washer functions to prevent the head of bolt 591 from being withdrawn through the enlarged end 593 of aperture 592 when bolt 591 is moved with respect to T-shaped member 594.

It will be appreciated that with the parts of the mechanism disposed in the positions illustrated in Figure 15, bolt 591 may undergo considerable movement with respect to lever 594 and in consequence, bell crank 586, together with shaft 579, may rotate with respect to the T-shaped lever.

To the end of arm 586 of the bell crank is secured by means of a pin 596 or the like, a clevis 597 which is threaded upon a rod 598, the other end of which is secured by means of a pin 599 to the arm 601 of a lever 602 provided with a second arm 603. Lever 602 is mounted for rotation upon a pin 604 and is restrained against removal therefrom by any suitable means, as for example by means of a cotter pin 605 or the like.

Also secured to pin 599 located in the end of lever arm 601 is a clevis member 608 mounted upon a rod 609, the other end of which is secured to the diaphragm of a fluid motor 610. Secured to the end of arm 603 of lever 602 in any suitable manner as for example by means of a pin 611 or the like is a clevis member 612 threaded onto a rod 613, the other end of which is secured to the diaphragm of a fluid motor 614. Fluid pressure is supplied to motors 610 and 614 by means of conduits 615 and 616, respectively, which are connected to a valve 617 through which fluid pressure is supplied by means of a conduit 618 from any suitable source of fluid energy, as for example the intake manifold. If desired, however, fluid under pressure, such as compressed air or oil pressure may be employed to operate motors 610 and 614.

Valve 617 is adapted to be actuated by a lever 619, to the end of which is secured a Bowden wire 621, which extends into a sheath 622 and is led upwardly toward the dashboard 623 of the vehicle. The end of wire 621 adjacent the dashboard 623 is provided with a knob 624 to facilitate manipulation of wire 621 with respect to the dashboard, to cause actuation of valve 617.

Lever 619 is adapted to dispose valve 617 in any one of three positions, the extreme upper position being shown in Figure 15. In this valve position, fluid energy or suction is transmitted directly from conduit 618 through conduit 615 to fluid motor 610, with the result that the diaphragm therein disposed is drawn toward the right and by means of rods 609 and 598, bell crank 586 together with shaft 579 is rotated into the position indicated in Figure 11.

Under such conditions conduit 616 leading to fluid pressure motor 614 is adapted to bleed to the atmosphere and the diaphragm of motor 614 is in consequence allowed to reciprocate to the left under the influence of rod 613 and lever 602.

If, however, lever 619 should be exposed in its extreme lower position, conduit 618 would be placed in direct communication with conduit 616 and fluid energy would be transmitted to fluid motor 614, with the result that its diaphragm would be drawn to the right, as seen in Figure 11, and rod 613 thereto attached would rotate lever 603 in a counter-clockwise direction to effect displacement of rod 598 to the left and rotation of bell crank 584, together with shaft 579 in a clockwise direction.

Under the conditions just described, conduit 615, leading to motor 610, is allowed to bleed to the atmosphere and the diaphragm of motor 610 is allowed to move to the left under the influence of rod 609 and lever 602. With valve lever 619 disposed in its intermediate or horizontal position, both conduits 615 and 616 leading to motors 610 and 614, respectively, will be placed in communication with the atmosphere to allow the respective diaphragms of the motors to move into any required position in response to manual actuation of shaft 579 in a manner to be presently described.

Figure 16:
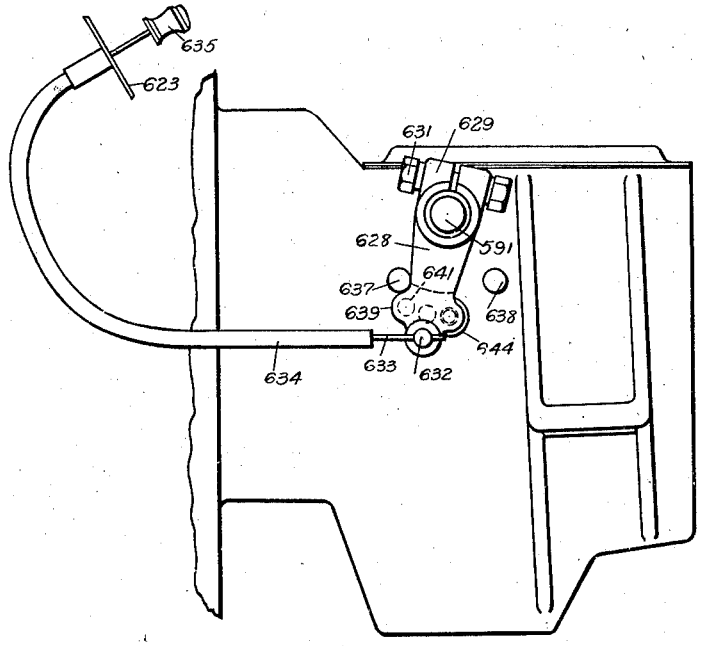
Figure 16 is a fragmentary elevational view of further parts of the control assembly associated with the form of my invention disclosed in Figure 11 as it appears when it is viewed from the near side of the transmission.

Referring now to Figure 16 of the drawings, stud shaft 579', which extends outwardly from housing 128a, is adapted to receive the collar of a lever 628 provided with a split hub 629 which, by means of a bolt 631, is adapted to secure lever 628 for rotation with shaft 579'. The end of lever 628 is provided with a binding post structure 632 adapted to accommodate a wire 633 protected by a sheath 634 and led upwardly toward panel 623 of the vehicle dashboard. Wire 633 and sheath 634 constitute a "Bowden" wire construction, and the end of wire 633 adjacent the vehicle dashboard is provided with a knob 635 to provide for manipulation of the wire to cause rotation of lever 628. Extending from housing 128a are two lug members 637 and 638 which act as stops for lever 628 to limit the range of rotation thereof. Lever 628 adjacent the end thereof is provided with an offset portion 639 having three recesses 641 formed in the bottom thereof. Recesses 641 are adapted to receive a detent ball 642 located within a bore 643 formed in a lug 644 provided on the transmission housing. Detent ball 642 is urged out of bore 643 into any one of recesses 642 by means of a compression spring 645.

It will be appreciated from the structure thus far described that lever 628 may be selectively disposed in any one of three positions by proper manipulation of knob 635, and will be retained in the position selected by reception of detent ball 642 in the proper recess 641.

From the control structure thus far described in connection with Figures 15 and 16, it will be appreciated that rotation of shaft 579 may be effected either automatically, by means of power applied thereto through fluid pressure motors 610 and 614 upon proper control of valve 617 through knob 624, or such rotation of shaft 579 may be effected manually by a proper manipulation of knob 635, resulting in rotation of stud shaft 579' and offset shaft 585.

When it is desired to rotate shaft 579 manually by operating knob 635, valve 617 is disposed in its neutral position, in order that air may bleed from the atmosphere through conduits 615 and 616 to fluid pressure motors 610 and 614, respectively, thereby allowing their diaphragms therein contained to be disposed in any desired position. Therefore, with valve 617 open, manual actuation of shaft 579 will not be inhibited by resistance offered by either of the fluid pressure motors.

As shaft 579 may be rotated either by power means or manually in the manner just described, sliding clutch 531 may be reciprocated either manually or by a selecting operation and in consequence the gear box may be shifted into either high or low drive or into neutral.

When it is desired to condition the gear box for reverse drive, by proper rotation of shaft 566, such a result is effected by proper rotation of the T-shaped member 594 previously described. To this end a structure 651 is mounted upon lever 594 and secured therein is a wire 652, which is led into a sheath member 653 supported with respect to transmission housing 128a by means of a bracket 654. Wire 652 and sheath 653 are led upwardly to the vehicle dashboard 623. Wire 652, adjacent the vehicle dashboard, is provided with a knob 655 to provide for actuation of the wire to the end that lever 594 may be selectively rotated. Lever 594 is mounted for rotation with shaft 566 in any suitable manner, as for example, by means of flattened faces 657 formed on the end of the shaft 566, which drivingly cooperate with flat portions formed in lever 594.

It will thus be appreciated that by a proper manipulation of knob 655, lever 594 may be rotated, together with shaft 566, to shift the gear box into reverse drive.

With the parts of the mechanism disposed in the positions disclosed in Figure 11, the gear box is positioned for direct forward drive, and reverse control lever 594 is disposed in its neutral position. If it is now desired to shift the gear box into reverse drive, it is only necessary to withdraw knob 655 and to move knob 624 into its neutral position. Lever 594, in response to actuation of knob 655 will be rotated in a clockwise direction as seen in Figure 11. Under such conditions bolt 591, secured to arm 586 of the bell crank and extending through enlarged aperture 593 formed in lever 594, is "cammed" and urged downwardly or in a clockwise direction (Figure 11) until its radial distance from shaft 566 is equal to the radial distance of arcuate slot 592 formed in lever 594. At this time lever 594 may be rotated to its extreme clockwise position by virtue of the fact that bolts 591 will be accommodated within slot 592. The parts are so designed that with bolt 591 disposed in the narrow portion of the slot, bell crank 584, to which the bolt is secured will be disposed together with shaft 579 in its neutral position.

It will thus be seen that when shaft 566 is rotated to condition the gear box for reverse drive, shaft 579 will automatically be rotated to position sliding clutch 531 in its neutral position. These parts constitute an interlock and make it impossible to have the gear box simultaneously conditioned for both forward and reverse drive. This mechanism provides a fool-proof and automatic guard against inadvertent control of the gear box on the part of the operator.

From an inspection of Figure 15, it will be readily appreciated that when lever 594 is disposed in its neutral position as indicated in that figure, shaft 579 may be rotated to any one of its three positions, and the gear box may accordingly be conditioned for either high or low gear drive without interference from lever 594.

*Operation of modified form of power transmitting mechanism*

The general operation of the modified form of my invention just described is similar to operation of the preferred form of my invention previously described in detail, and for this reason a detailed description of operation will not be made and only the part of the operation which differs from that of the preferred form of my invention will be made. It will be appreciated that in the modified form of my invention, the secondary clutch is effective to connect the planetary pinion carrier to the driving shaft instead of connecting the planetary pinion carrier to the driven shaft as is the case in the preferred form of my invention, as has been pointed out in connection with the secondary clutch structure.

If the gear box is now assumed to be conditioned with the forward and reverse sliding clutches disposed in their neutral position, the driving shaft 3a may be accelerated for purposes of warming up the prime mover of the vehicle and in such event even though the primary clutch may engage, no power will be transmitted to the driven shaft because of the neutral positions assumed by the gear box parts.

If desired, any suitable manual control may be associated with the primary clutch for allowing selective engagement and disengagement of the clutch irrespective of the speeds at which the driving shaft is rotating. The structure may take the form of a throwout mechanism similar to that disclosed in connection with the preferred form of my invention or may take any other suitable form. The secondary clutch also may be equipped with a similar throwout mechanism. As the driving shaft and primary clutch cover are accelerated under conditions of warming up the prime mover of the vehicle, it will be appreciated that the primary clutch cover "overruns" with respect to shaft 9a so that no rotational efforts are applied to shaft 9a until the centrifugal weights of the primary clutch cause engagement thereof.

Should the gear box be shifted for transmission of either direct or amplified torque to shaft 305a, operation of the modified form of my invention will be similar to operation of the preferred form of my invention previously described at length. Should it be desired to shift the sliding clutch 531 from either its high to its low position or vice versa, this may be effected by actuating either knob 624 or knob 635 in the proper direction to obtain the desired gear ratio. Such shift is preferably effected simultaneously with, or slightly subsequent to releasing the accelerator pedal and, if any manual throwout control be associated with the primary clutch, simultaneously with actuation of such controls to disengage the primary clutch. Release of the accelerator pedal and manual disengagement of the primary clutch will be effective to prevent further transmission of torque from the driving shaft to the shaft 9a. Actuation of either knob 624 or 635 of the vehicle dash will be effective to cause shifter fork 571 to urge the sliding clutch 531 into the position desired and such actuation of the sliding clutch 531 will be automatically effected in a smooth, non-clashing manner by means of pin 549 and collar member 540 as hereinbefore described in detail.

Knob 624 may also be actuated in a pre-selective manner to effect gear shifts in the gear box. Assuming that the vehicle is proceeding with the throttle opened to a substantial degree with the transmission disposed in low or high and the gear box disposed in low and it is desired to shift the gear box into high, knob 624 may be pulled into the high gear position shown in Figure 15 without effecting a shift, because under these conditions the vacuum in the intake manifold is too low to cause fluid motor 610 to rock shaft 579 into high gear position against the action of detent 642. When the operator decides to make the shift, all that he need do is momentarily release the accelerator as this promptly establishes a high vacuum in the intake manifold and affords sufficient fluid energy to cause fluid motor 610 to shift the parts into high gear. Whether or not the transmission will shift during this operation, depends upon the speed of the parts. The shift from high to low gear may be effected in a similar manner.

Although I have illustrated individual knobs 624, 635 and 655 for actuating the gear box parts, it is to be understood that if desired a combination control device may be utilized for controlling two or all of them without departing from the spirit of the invention.

The mechanism for automatically shifting clutch 531 in the gear box when the parts have been synchronized has been provided by virtue of the relatively large mass which it is necessary to synchronize when clutch 531 is shifted, and to make it possible to employ a fully automatic primary clutch.

Assuming that it is desired to drive the vehicle in a reverse direction, control knob 655 on the vehicle dashboard may be actuated in the manner previously described to shift the reverse clutch and the reverse idler gear into their positive operative positions. Under such conditions torque will be transmitted through the modified form of my invention without the necessity of locking the pinion carrier against rotation as was the case with the preferred form of my invention. It will be appreciated that a carrier lock is here unnecessary by virtue of the fact that the gear box, which provides reverse drive, is disposed behind the pinion carrier, instead of in front of the carrier, as was the case in the first form of my invention.

If it desired to crank the engine by towing or coasting the vehicle, it is necessary only that the gear box be conditioned for forward drive, and transmission of torque will be effected from the driven shaft to shaft 9a in a manner described in connection with the preferred form of my invention, except for the fact that it is unnecessary to engage the primary clutch, as the reversed one-way clutch automatically takes care of the drive between shafts 9a and 3a. The overrunning clutch performs the further highly desirable function of automatically cranking the engine should the latter tend to stall during gear shifting operations.

It is therefore apparent that I have provided simplified power transmitting mechanisms which are efficient and require a minimum of controlling operations and yet which are so designed that they may be cheaply manufactured.

In all the forms of my invention I have illustrated a transmission as being combined with a gear box, but it is to be understood that these units are capable of other uses apart from the combination. For instance, in light vehicles the transmission may be employed without a gear box, whereas in trucks, buses or other heavy vehicles such as rail cars, two or more of the transmissions illustrated may be arranged in series (with or without a gear box to provide an emergency range of further values of torque multiplication) and the gear ratios and the secondary clutches designed so that initial release of the accelerator, when all of the transmissions are operating in low gear, will be operable to shift one of them into high, and upon a second release of the accelerator, subsequent to a further acceleration of the vehicle, will be operable to shift another of the transmissions into high gear or direct drive. Moreover, the novel gear box controlling mechanisms, and also the synchronizer shown in Figure 11, although particularly useful with the transmission-gear box combination disclosed, may be advantageously employed aside from this combination and in connection with other gear boxes. The appended claims are accordingly intended to embrace the novel units of my power transmitting mechanisms when they are used aside from the particular combinations in which they are disclosed.

Although I have disclosed, and prefer to employ speed responsive primary clutches with my transmission-gear box combinations, it is to be understood that if desired they may be replaced by manually operable, or vacuum operated conventional friction clutches, and in some installations the driven shaft of the clutch may be directly connected to the prime mover, without departing from the spirit of my invention. Moreover, vacuum actuated or other power means may be utilized to supplement the normal speed responsive operation of the primary and secondary clutches. Moreover, in the illustrated embodiments of my invention I have shown, and prefer to employ secondary clutches which are of different construction than the primary clutches, because the centrifugal weights may be disposed outwardly of the carrier bearing supports, which makes it possible to use substantially all of the space in the housing, the secondary clutches, if desired, may be constructed in the same manner as the primary clutches, and vice versa, without departing from the spirit of my invention.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. In a power transmitting mechanism, driving and driven members mounted for rotation and adapted to have power applied thereto and taken therefrom respectively, a torque multiplying device normally interconnecting said members and adapted to transmit power therebetween, said device embodying means whereby the same is automatically operable to maintain a torque multiplying drive so long as power is transmitted from said driving member to said driven member, means associated with said device for automatically establishing a direct two-way drive between said members when said driving member is momentarily decelerated to a speed only slightly below the normal speed of the driving member, but substantially in excess of speed of the driven member, said means embodying driving and driven clutch plates and centrifugal means for forcing them into frictional engagement, one of said plates being connected to said driven member by means of a resiliently yieldable, but non-slipping coupling device, for absorbing any force stresses manifested during the transition from torque multiplying to direct drive.

2. The power transmitting mechanism described in claim 1, wherein said torque multiplying device embodies planetary gearing having a plurality of planets mounted in a rotatable structure, which is normally stationary when power is transmitted from the driving to the driven member through said gearing, but which is rotatable as a unit with said driving and driven shaft in direct drive, and wherein said driving plates of said friction clutch are carried by said rotatable structure and said centrifugal mechanism comprises a plurality of weight levers rockably mounted in said structure and which are of sufficient mass to respond to comparatively low speeds of rotation of said supporting structure, whereby the transition from torque multiplying to direct drive will occur when the driving shaft is only slightly decelerated.

3. In a power transmitting mechanism, driving and driven members mounted for rotation and adapted to have power applied thereto and taken therefrom respectively; a torque multiplying mechanism normally interconnecting said members and adapted to transmit power therebetween, said torque multiplying mechanism comprising a rotatable element which is normally stationary when power is transmitted through said torque multiplying mechanism and which is operable to establish a direct drive between said members when it is connected to said driven member, said torque multiplying mechanism being automatically operable to accelerate said element when a reversal of torque forces occurs therein; and a speed-responsive clutch, embodying driving and driven clutch plates, certain of said plates being connected to said rotatable element, and certain other of said plates being connected to said driven member, and a plurality of outwardly movable centrifugal weights rotatable synchronously with said rotatable element and operable to force said clutch plates into frictional engagement, and abutment means associated with said rotatable element for arresting said weights after they attain a predetermined outward position, for thereby predetermining the pressure built up between said frictional clutch plates, said driving and driven clutch plates having frictional areas only slightly in excess of that requisite to impart to said clutch a torque capacity sufficient to handle the maximum torque demanded by direct drive conditions, for smoothly connecting said element to one of said members when said element attains a predetermined speed.

4. In an automatic power transmitting mechanism, a housing, a driving member and a driven member disposed in axial alignment in said housing and mounted for relative rotation, the neighboring ends of said members being journalled within each other and the remote ends being journalled in said housing, said driving and driven members, adjacent their neighboring ends, being provided with a driving and a driven sun gear respectively, a planet carrier concentrically disposed with respect to said members and having planet gears meshing with said sun gears, one end of said carrier being journalled upon said driving member adjacent the sun gear thereof but having the other end thereof completely spaced from said driven member and journalled in said housing, a plurality of overrunning clutch rollers cooperating with a race provided on said housing and with the cylindrical portion of said carrier adjacent the portion thereof which is journalled in said housing.

JOSEPH E. PADGETT.